(12) United States Patent
Tsuiki et al.

(10) Patent No.: US 10,153,674 B2
(45) Date of Patent: Dec. 11, 2018

(54) ARMATURE FOR AN ELECTRIC MACHINE

(71) Applicant: MITSUBISHI ELECTRIC CORPORATION, Chiyoda-ku, Tokyo (JP)

(72) Inventors: Hironori Tsuiki, Tokyo (JP); Atsushi Sakaue, Tokyo (JP); Akira Hashimoto, Tokyo (JP); Hiroyuki Akita, Tokyo (JP); Masaya Inoue, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 197 days.

(21) Appl. No.: 15/029,538

(22) PCT Filed: Jul. 7, 2014

(86) PCT No.: PCT/JP2014/068054
§ 371 (c)(1),
(2) Date: Apr. 14, 2016

(87) PCT Pub. No.: WO2015/079732
PCT Pub. Date: Jun. 4, 2015

(65) Prior Publication Data
US 2016/0268860 A1    Sep. 15, 2016

(30) Foreign Application Priority Data

Nov. 29, 2013    (JP) .................. 2013-247037

(51) Int. Cl.
*H02K 3/12*    (2006.01)
*H02K 3/28*    (2006.01)

(52) U.S. Cl.
CPC .................. *H02K 3/28* (2013.01); *H02K 3/12* (2013.01)

(58) Field of Classification Search
CPC .................. H02K 3/12; H02K 3/28
(Continued)

(56) References Cited

U.S. PATENT DOCUMENTS 4,354,127 A * 10/1982 Stroud .................. H02K 3/28
310/198
4,774,428 A * 9/1988 Konecny .............. H02K 21/22
310/156.12
(Continued)

FOREIGN PATENT DOCUMENTS

JP    3508755 B2    3/2004
JP    3593009 B2    11/2004
(Continued)

OTHER PUBLICATIONS

International Search Report (PCT/ISA/210) dated Sep. 30, 2014, by the Japanese Patent Office as the International Searching Authority for International Application No. PCT/JP2014/068054.
(Continued)

*Primary Examiner* — John K Kim
(74) *Attorney, Agent, or Firm* — Buchanan Ingersoll & Rooney PC

(57) ABSTRACT

An armature for an electric machine according to the present invention includes: an armature core in which a plurality of slots are arranged in a circumferential direction; and an armature winding that is mounted to the armature core, and includes a plurality of two-lane winding bodies that are each produced by stacking and winding two jointless continuous conductor wires that are coated with insulation such that the two conductor wires are stacked in a radial direction of the armature core, the two-lane winding bodies being arranged at a pitch of one slot in a circumferential direction so as to (Continued)

be mounted into a third slot, a first slot, and a second slot that line up consecutively in the circumferential direction at an angular spacing of six slots.

9 Claims, 19 Drawing Sheets

(58) Field of Classification Search
USPC .......................................... 310/201, 206, 208
IPC ................................................. H02K 3/12, 3/28
See application file for complete search history.

(56) References Cited

U.S. PATENT DOCUMENTS

| | | | |
|---|---|---|---|
| 6,525,443 B2 | 2/2003 | Asao | |
| 7,268,455 B2 * | 9/2007 | Kouda | H02K 3/12 29/596 |
| 8,294,324 B2 * | 10/2012 | Ishigami | H02K 3/12 310/206 |
| 9,318,926 B2 * | 4/2016 | Dajaku | H02K 3/28 |
| 2002/0030417 A1 | 3/2002 | Asao | |
| 2005/0116571 A1 * | 6/2005 | Ichikawa | H02K 3/12 310/201 |
| 2008/0174199 A1 | 7/2008 | Ishigami et al. | |
| 2010/0026132 A1 | 2/2010 | Ooiwa et al. | |
| 2016/0268860 A1 * | 9/2016 | Tsuiki | H02K 3/28 |

FOREIGN PATENT DOCUMENTS

| | | |
|---|---|---|
| JP | 2008-167567 A | 7/2008 |
| JP | 2010-035381 A | 2/2010 |
| JP | 2011-072052 A | 4/2011 |
| JP | 5040303 B2 | 10/2012 |

OTHER PUBLICATIONS

Written Opinion (PCT/ISA/237) dated Sep. 30, 2014, by the Japanese Patent Office as the International Searching Authority for International Application No. PCT/JP2014/068054.

* cited by examiner

FIRST LAYER
SECOND LAYER
THIRD LAYER
FOURTH LAYER
FIFTH LAYER
SIXTH LAYER
SEVENTH LAYER
EIGHTH LAYER

CONVENTIONAL EXAMPLE

FIRST LAYER
SECOND LAYER
THIRD LAYER
FOURTH LAYER
FIFTH LAYER
SIXTH LAYER
SEVENTH LAYER
EIGHTH LAYER

ARMATURE FOR AN ELECTRIC MACHINE

TECHNICAL FIELD

The present invention relates to an armature for a rotary electric machine such as an electric motor or a generator, or for an electric machine such as a direct acting machine such as a linear motor, and particularly relates to an armature winding construction.

BACKGROUND ART

In recent years, compactness, high output, and high voltage tolerance for implementing increases in voltage have been required in rotary electric machines such as electric motors or generators.

In order to make rotary electric machines of this kind more compact, armature windings that have concentrated windings in which conductor wires are wound onto individual armature core teeth have been used with a view to making coil ends, which do not generate effective magnetic flux, more compact. However, compact armatures that use armature windings of distributed winding construction that can suppress torque pulsation and increase output are in demand. In addition, demand for induction machines that do not use magnets has also increased due to steep rises in magnet costs, and there is demand for armatures that use armature windings that have higher-efficiency distributed winding constructions.

Now, in contrast to concentrated windings, which are configured by winding conductor wires onto individual teeth, windings that are configured by winding conductor wires into slots that are separated by two or more slots are called "distributed windings". In other words, distributed windings are wound such that a conductor wire that extends outward from one slot spans two or more consecutive teeth and enters another slot.

In Patent Literature 1, winding coils that are molded into a helical shape by winding a conductor wire for a plurality of times, also known as "hexagonal coils", are housed in respective pairs of slots that are separated by a plurality of slots to constitute an armature winding that has a distributed winding construction. Moreover, spacing between the two slots that form the pair of slots is decided based on the number of slots and the number of poles in the armature.

In Patent Literature 2, coil segments that are shaped by bending into a U shape are housed in respective pairs of slots that are separated by a plurality of slots, end portions of the coil segments are bent and folded, and the bent and folded end portions of the coil segments are welded to each other to constitute an armature winding that has a distributed-winding construction.

In Patent Literature 3, a coil assembly that is produced by interweaving a plurality of wave-wound coils in which conductor wires are formed into wave shapes is mounted to a rectangular parallelepiped core, the core in question is rolled up into an annular shape, and butted portions of the rolled-up core are welded to constitute an armature winding that has a distributed-winding construction.

CITATION LIST

Patent Literature

Patent Literature 1: Japanese Patent No. 5040303 (Gazette)

Patent Literature 2: Japanese Patent No. 3508755 (Gazette)

Patent Literature 3: Japanese Patent No. 3593009 (Gazette)

SUMMARY OF THE INVENTION

Problem to be Solved by the Invention

In Patent Literature 1, vertex portions of coil ends that are assemblies of return portions of the hexagonal coils were shaped into crank shapes that are offset in a direction of alignment of the return portions by an amount proportionate to full widths of the return portions in the direction of alignment, and the hexagonal coils were inserted between a bottom portion end of a first slot of the slot pair and an opening portion side of a second slot. Thus, the bending radius when the vertex portions of the coil ends are shaped by bending into the crank shapes is increased, and one problem has been that radial dimensions and axial dimensions of the coil ends are increased.

In Patent Literature 2 and 3, because the vertex portions of the return portions of the coil segments and the wave-wound coils are formed into crank shapes that are offset by a width of a single conductor wire, the bending radius when the vertex portions of the return portions are shaped by bending into the crank shapes is reduced, suppressing increases in the radial dimensions and axial dimensions of the coil ends.

However, in Patent Literature 2, because the number of the coil segments that constitute the armature winding is increased, increasing the number of welding points, some problems have been that takt time during production is increased, and also that quality problems arise easily. In Patent Literature 3, one problem has been that the step of weaving in the wave-wound coils is complicated, reducing productivity. In addition, in Patent Literature 2 and 3, positions in the coil ends at which different-phase coils, where electric potential differences are comparatively large, are in close proximity to each other in a radial direction are increased, and one problem has been that there is an increased risk of dielectric breakdown occurring if a higher voltage is applied.

The present invention aims to solve the above problems and an object of the present invention is to provide an armature for a compact, high-output electric machine by adapting a coil shape of a distributed winding coil to increase ease of shaping of the distributed winding coil, to reduce positions of radial proximity between different-phase coils that have larger electric potential differences, and to suppress increases in diameter of the coil ends that result from shaping the vertex portions into crank shapes by bending.

Means for Solving the Problem

An armature for an electric machine according to the present invention includes: an armature core in which a plurality of slots are arranged in a slot width direction; and an armature winding that is mounted to the armature core, and includes a plurality of two-lane winding bodies that are each produced by stacking and winding two jointless continuous conductor wires that are coated with insulation such that the two conductor wires are stacked in a slot depth direction of the armature core, the two-lane winding bodies being arranged at a pitch of one slot in a direction of slot arrangement so as to be mounted into a third slot, a first slot, and a second slot that line up consecutively in the direction of slot arrangement at an angular spacing of p slots, where p is a natural number that is greater than or equal to 2.

Effects of the Invention

According to the present invention, because two-lane winding bodies that are produced by stacking and winding two conductor wires are mounted into three slots that line up consecutively in a direction of slot arrangement at an angular spacing of p slots, the amount of displacement at the top portions of the coil end portions is double the width of the conductor wires in the slot depth direction. Thus, the bending radius is reduced when shaping the top portions of the coil end portions into crank shapes by bending compared to when hexagonal coils are used, enabling radial dimensions and axial dimensions of the coil ends to be reduced.

Because the two-lane winding bodies 221 are produced so as to be mounted into three slots that line up consecutively in the direction of slot arrangement at an angular spacing of p slots, the number of welded points is reduced compared to coil segments, reducing takt time during production, and also suppressing the occurrence of quality problems.

Because the armature winding can be produced by assembling the two-lane winding bodies sequentially from the direction of slot arrangement, the complicated step of interweaving wave-wound coils is no longer required, increasing productivity.

Because the conductor wires that constitute the two-lane winding bodies are wound so as to cycle among three slots by being folded back at second and third slots that are positioned on two sides of a first slot, the directions in which the coil end portions are displaced in a slot depth direction alternate. Thus, positions at which different-phase coil end portions, where electric potential differences are comparatively large, approach each other in the slot depth direction are reduced, reducing the risk that dielectric breakdown may occur.

DESCRIPTION OF EMBODIMENTS

Preferred embodiments of an armature for an electric machine according to the present invention will now be explained with reference to the drawings.

Embodiment 1

Figure 1:
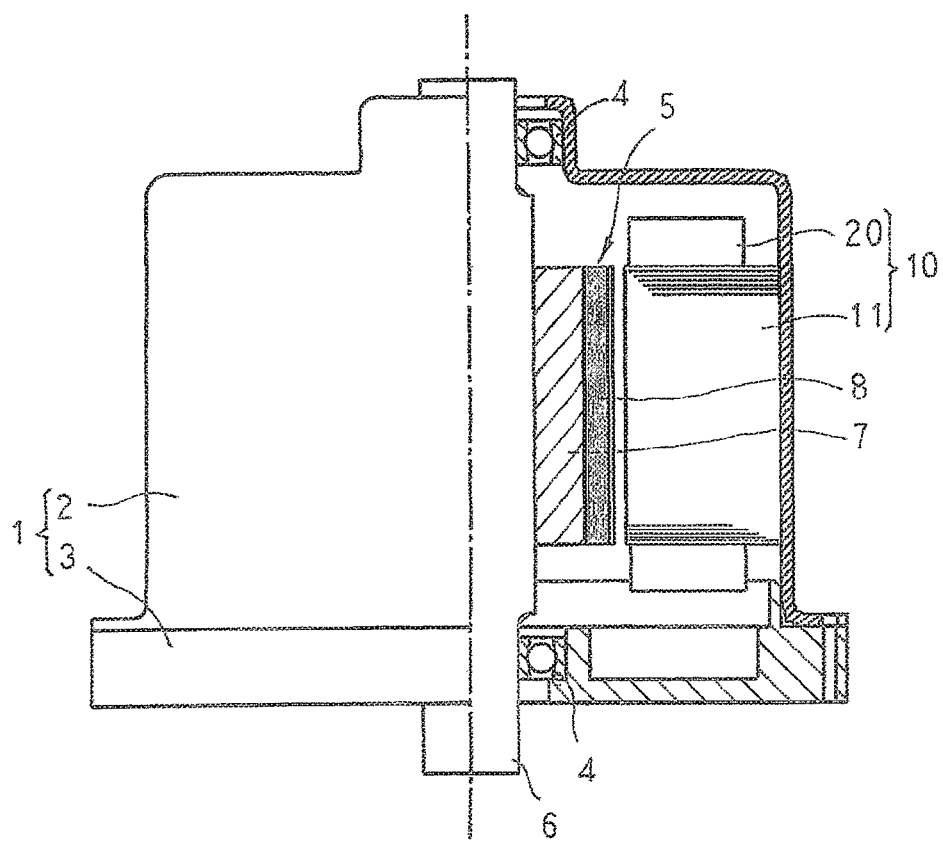
FIG. 1 is a half section that shows a rotary electric machine according to Embodiment 1 of the present invention.
Figure 2:
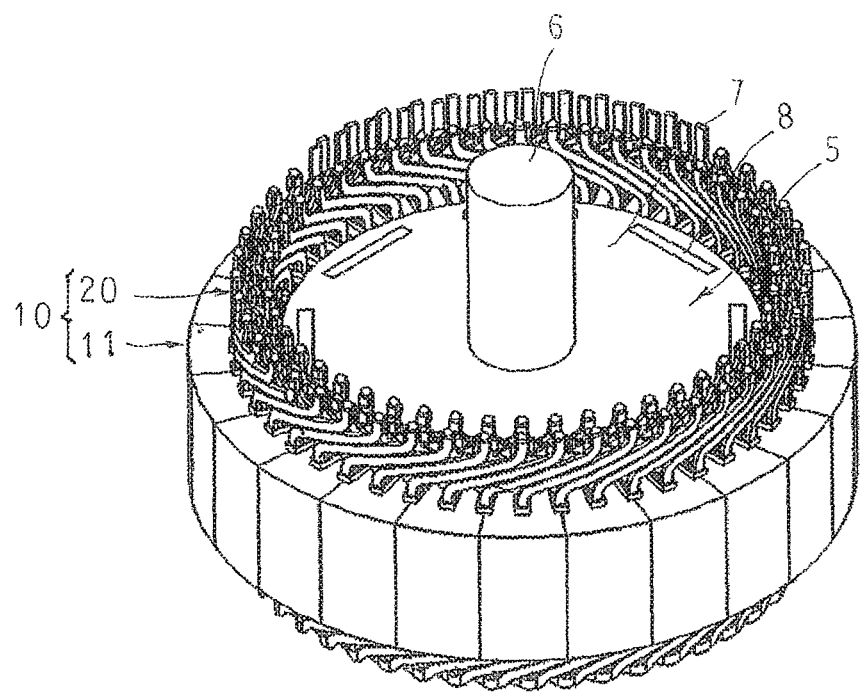
FIG. 2 is an oblique projection that shows part of the rotary electric machine according to Embodiment 1 of the present invention.
Figure 3:
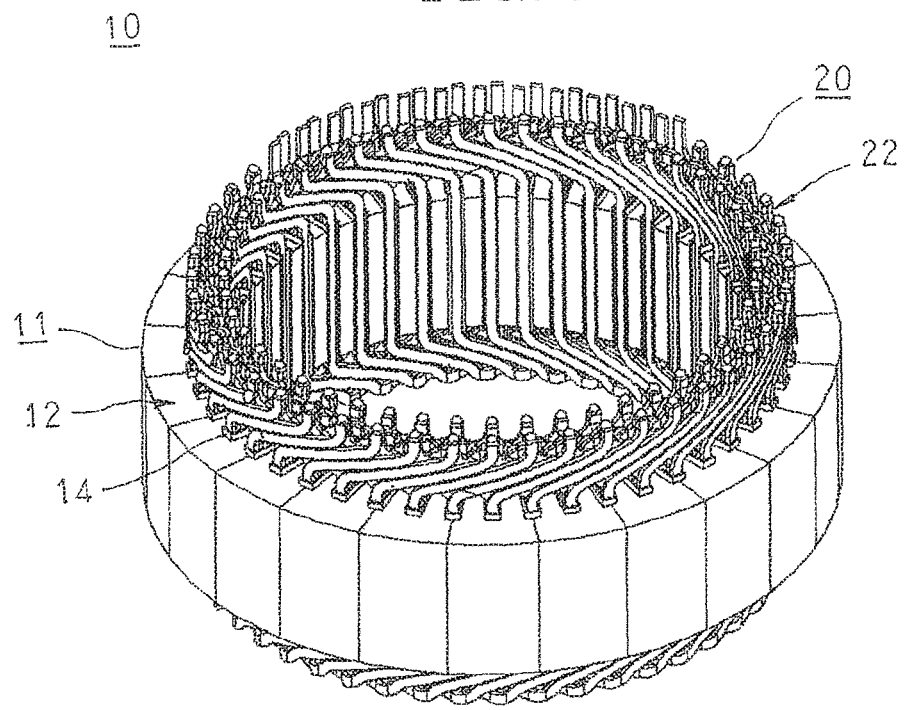
FIG. 3 is an oblique projection that shows an armature that is used in the rotary electric machine according to Embodiment 1 of the present invention.
Figure 4:
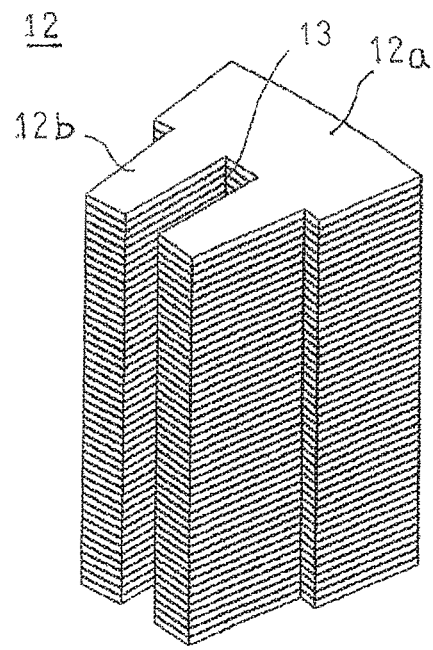
FIG. 4 is an oblique projection that shows a core block that constitutes part of the armature that is used in the rotary electric machine according to Embodiment 1 of the present invention.
Figure 5:
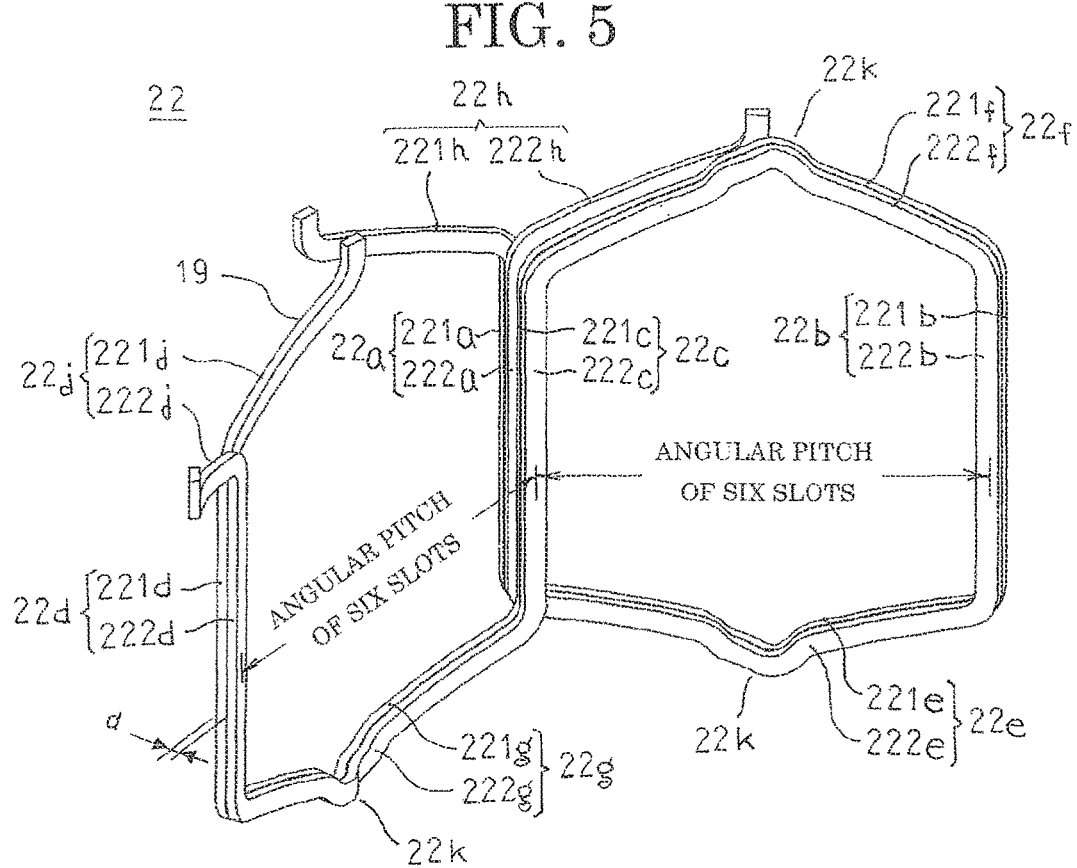
FIG. 5 is an oblique projection that shows a two-lane winding body that constitutes part of an armature winding in the rotary electric machine according to Embodiment 1 of the present invention.
Figure 6:
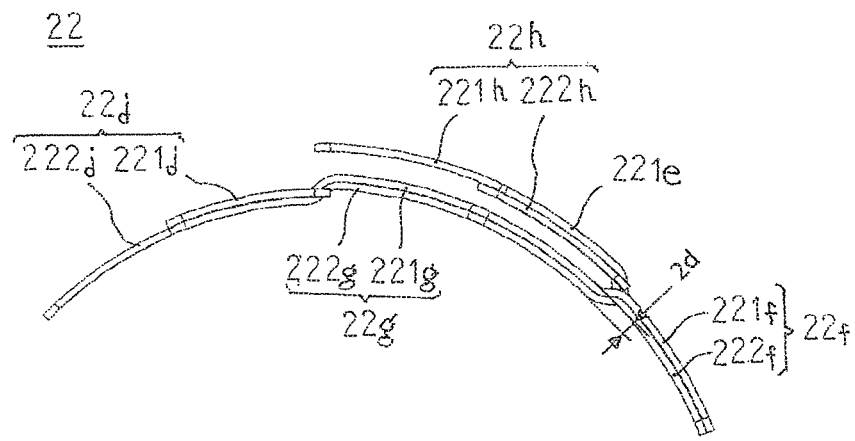
FIG. 6 is an end elevation that shows the two-lane winding body that constitutes part of the armature winding in the rotary electric machine according to Embodiment 1 of the present invention.
Figure 7:
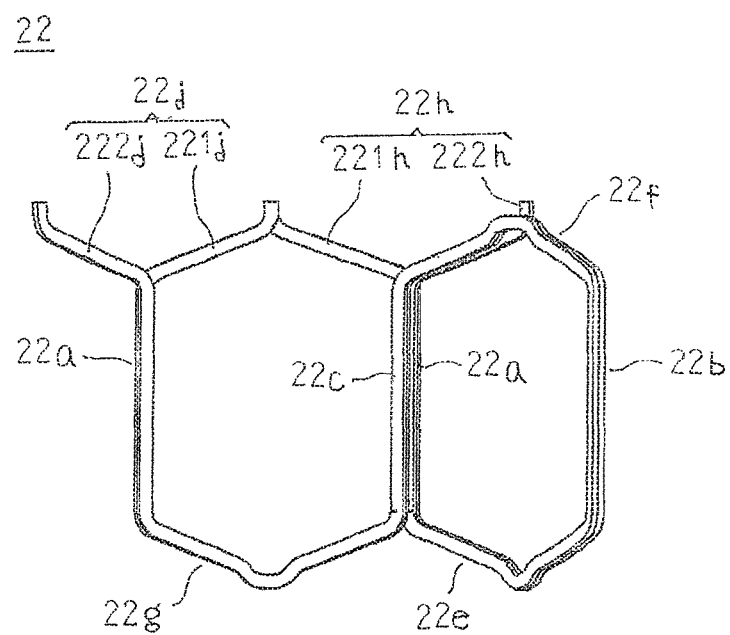
FIG. 7 is a front elevation that shows the two-lane winding body that constitutes part of the armature winding in the rotary electric machine according to Embodiment 1 of the present invention.
Figure 8:
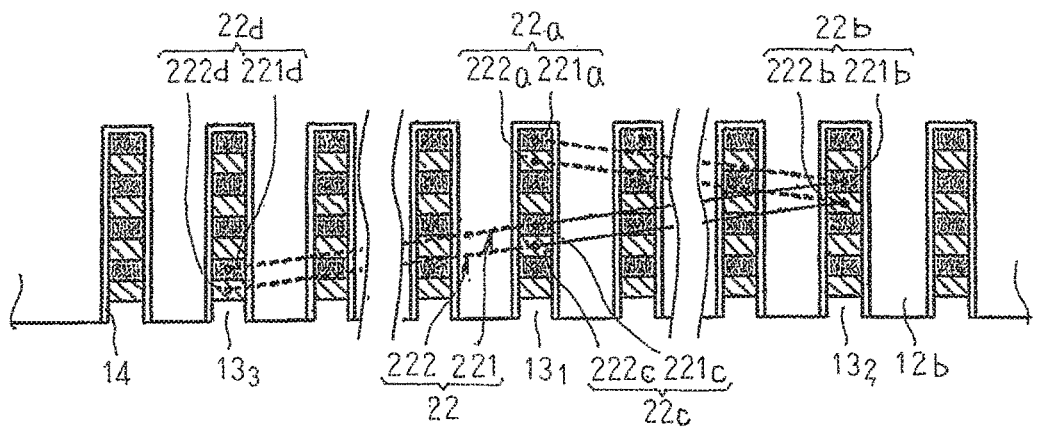
FIG. 8 is a schematic diagram of a state in which the armature winding in the rotary electric machine according to Embodiment 1 of the present invention is mounted to the armature core when viewed from a vicinity of first coil ends.

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows an armature that is used in the rotary electric machine according to Embodiment 1 of the present invention, FIG. 4 is an oblique projection that shows a core block that constitutes part of the armature that is used in the rotary electric machine according to Embodiment 1 of the present invention, FIG. 5 is an oblique projection that shows a two-lane winding body that constitutes part of an armature winding in the rotary electric machine according to Embodiment 1 of the present invention, FIG. 6 is an end elevation that shows the two-lane winding body that constitutes part of the armature winding in the rotary electric machine according to Embodiment 1 of the present invention, FIG. 7 is a front elevation that shows the two-lane winding body that constitutes part of the armature winding in the rotary electric machine according to Embodiment 1 of the present invention, and FIG. 8 is a schematic diagram of a state in which the armature winding in the rotary electric machine according to Embodiment 1 of the present invention is mounted to the armature core when viewed from a vicinity of first coil ends. Moreover, for simplicity, coil end portions are represented as straight lines in FIG. 8.

In FIGS. 1 and 2, a rotary electric machine 100 that functions as an electric machine includes: a housing 1 that has: a floored cylindrical frame 2; and an end plate 3 that closes an opening of the frame 2; an armature 10 that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the armature 10.

The rotor 5 is a permanent-magnet rotor that includes: a rotor core 7 that is fixed to the rotating shaft 6, which is inserted through a central position thereof; and permanent magnets 8 that are embedded in a vicinity of an outer circumferential surface of the rotor core 7 so as to be arranged at a uniform pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the armature 10 will be explained in detail with reference to FIGS. 3 through 7.

As shown in FIG. 3, the armature 10 includes: an annular armature core 11; and an armature winding 20 that is mounted onto the armature core 11. Here, to facilitate explanation, the number of poles in the rotor 5 is eight poles, the number of slots in the armature core 11 is forty-eight, and the armature winding 20 is a three-phase winding. In other words, the slots are formed on the armature core 11 at a ratio of two slots per phase per pole.

As shown in FIG. 4, core blocks 12 are made by dividing the annular armature core 11 into twenty-four equal sections circumferentially, are produced by laminating and integrating electromagnetic steel sheets, and include: a core back portion 12a that has a circular arc-shaped cross section; and two teeth 12b that are disposed so as to protrude radially inward from an inner circumferential wall surface of the core back portion 12a. The armature core 11 is configured into an annular shape by arranging and integrating twenty-four core blocks 12 circumferentially by butting together circumferential side surfaces of the core back portions 12a such that the teeth 12b are oriented radially inward. Slots 13 that are formed by the core back portions 12a and circumferentially adjacent teeth 12b are arranged at a uniform angular pitch circumferentially so as to be open on an inner circumferential side. The teeth 12b are formed so as to have a tapered shape in which a circumferential width becomes gradually narrower radially inward, and a cross section of the slots 13 is rectangular.

A two-lane winding body 22 is produced by winding two conductor wires 19 into an edgewise winding, the two conductor wires 19 each being made of jointless continuous copper wire or aluminum wire that is insulated using an enamel resin, for example, having flat shapes (oblong cross sections) that have a short-side width of d, and being stacked in a short-side direction. Moreover, because the two-lane winding bodies 22 are wound into an edgewise winding, a short-side direction of the conductor wires 19 is oriented in a radial direction of the armature 10, and a long-side direction of the conductor wires 19 is aligned in a circumferential direction of the armature 10.

As shown in FIGS. 5 through 7, the two-lane winding bodies 22 are distributed windings that include: first rectilinear portions 22a (first rectilinear portions 221a and 222a) and third rectilinear portions 22c (third rectilinear portions 221c and 222c) that are inserted into a first slot; second rectilinear portions 22b (second rectilinear portions 221b and 222b) that are inserted into a second slot that is separated from the first slot by an angular spacing of six slots in a first circumferential direction; fourth rectilinear portions 22d (fourth rectilinear portions 221d and 222d) that are inserted into a third slot that is separated from the first slot by an angular spacing of six slots in a second circumferential direction; first coil end portions 22e (first coil end portions 221e and 222e) that link together second longitudinal ends of the first rectilinear portions 22a and the second rectilinear portions 22b; second coil end portions 22f (second coil end portions 221f and 222f) that link together first longitudinal ends of the second rectilinear portions 22b and the third rectilinear portions 22c; third coil end portions 22g (third coil end portions 221g and 222g) that link together second longitudinal ends of the third rectilinear portions 22c and the fourth rectilinear portions 22d; and winding ends 22h (winding ends 221h and 222h) and winding ends 22j (winding ends 221j and 222j) that extend outward from first longitudinal ends of the first rectilinear portions 22a and the fourth rectilinear portions 22d, and that are connected to other winding bodies or to electric power supplying portions.

Thus, the two-lane winding bodies 22 include: a radially outer winding body 221 that is constituted by the conductor wire 19 that is positioned on the radially outer side of the two conductor wires 19 that are stacked in the short-side direction; and a radially inner winding body 222 that is constituted by the conductor wire 19 that is positioned on the radially inner side of the two conductor wires 19 that are stacked in the short-side direction. The radially outer winding body 221 includes: the first through fourth rectilinear portions 221a through 221d; the first through third coil end portions 221e through 221g; and the winding ends 221h and 221j. The winding ends 221h and 221j extend outward from the first longitudinal ends of the first and fourth rectilinear portions 221a and 221d so as to be inclined circumferentially so as to approach each other without changing radial positions. The radially inner winding body 222 includes: the first through fourth rectilinear portions 222a through 222d; the first through third coil end portions 222e through 222g; and the winding ends 222h and 222j. The winding ends 222h and 222j extend outward from the first longitudinal ends of the first and fourth rectilinear portions 222a and 222d so as to be inclined circumferentially so as to separate from each other without changing radial positions.

The first rectilinear portions 22a and the second rectilinear portions 22b are disposed so as to be displaced radially by 2d at crank portions 22k that are formed on top portions of the first coil end portions 22e. Similarly, the second rectilinear portions 22b and the third rectilinear portions 22c are disposed so as to be displaced radially by 2d at crank portions 22k that are formed on top portions of the second coil end portions 22f. Similarly, the third rectilinear portions 22c and the fourth rectilinear portions 22d are disposed so as to be displaced radially by 2d at crank portions 22k that are formed on top portions of the third coil end portions 22g. Moreover, an angular spacing of six slots is a spacing between slot centers of slots 13 on two sides of six consecutive teeth 12b.

As shown in FIG. 8, the two-lane winding bodies 21 that are configured in this manner are mounted to the armature core 11 such that the two conductor wires 19 are inserted into a first slot 131 from a vicinity of a first end of the armature core 11, extend outward from the first slot 131 at a second end of the armature core 11, are inserted from the second end of the armature core 11 into a second slot 132 that is separated by an angular spacing of six slots in a first circumferential direction, extend outward from the second slot 132 at the first end of the armature core 11, are inserted from the first end of the armature core 11 into the first slot 131 that is separated by an angular spacing of six slots in the second circumferential direction, extend outward from the first slot 131 at the second end of the armature core 11, are inserted from the second end of the armature core 11 into a third slot 133 that is separated by an angular spacing of six slots in the second circumferential direction, and extend outward from the third slot 133 at the first end of the armature core 11.

Moreover, in FIG. 8, to facilitate explanation, the slots 13 that are circumferentially consecutive at an angular spacing of six slots have been designated the third slot 133, the first slot 131, and the second slot 132 in order circumferentially. Furthermore, in FIG. 8, the first through third coil end portions 22e through 22g are depicted rectilinearly, but the second rectilinear portions 22b, which are inserted into the third slot 133, are lane-changed by 2d radially outward at the crank portions 22k of the first coil end portions 22e relative to the first rectilinear portions 22a, which are inserted into the first slot 131. The third rectilinear portions 22c, which are inserted into the first slot 131, are lane-changed by 2d radially outward at the crank portions 22k of the second coil end portions 22f relative to the second rectilinear portions 22b, which are inserted into the second slot 132. In addition, the fourth rectilinear portions 22d, which are inserted into the third slot 133, are lane-changed by 2d radially outward at the crank portions 22k of the third coil end portions 22g relative to the third rectilinear portions 22c, which are inserted into the first slot 131.

Figure 10C:
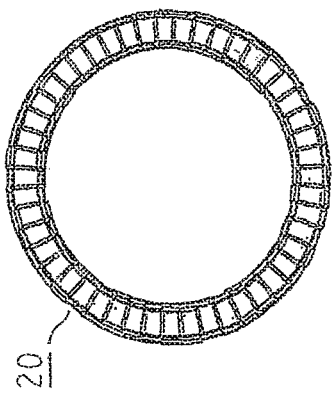
FIGS. 10A, 10B and 10C show diagrams that explain the method for assembling the armature winding in the rotary electric machine according to Embodiment 1 of the present invention.
Figure 10B:
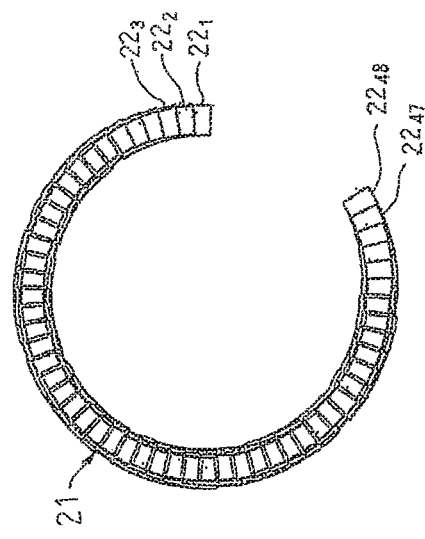
Figure 10A:
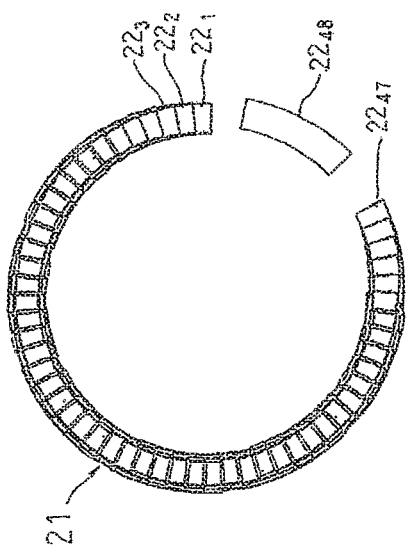
Figure 11:
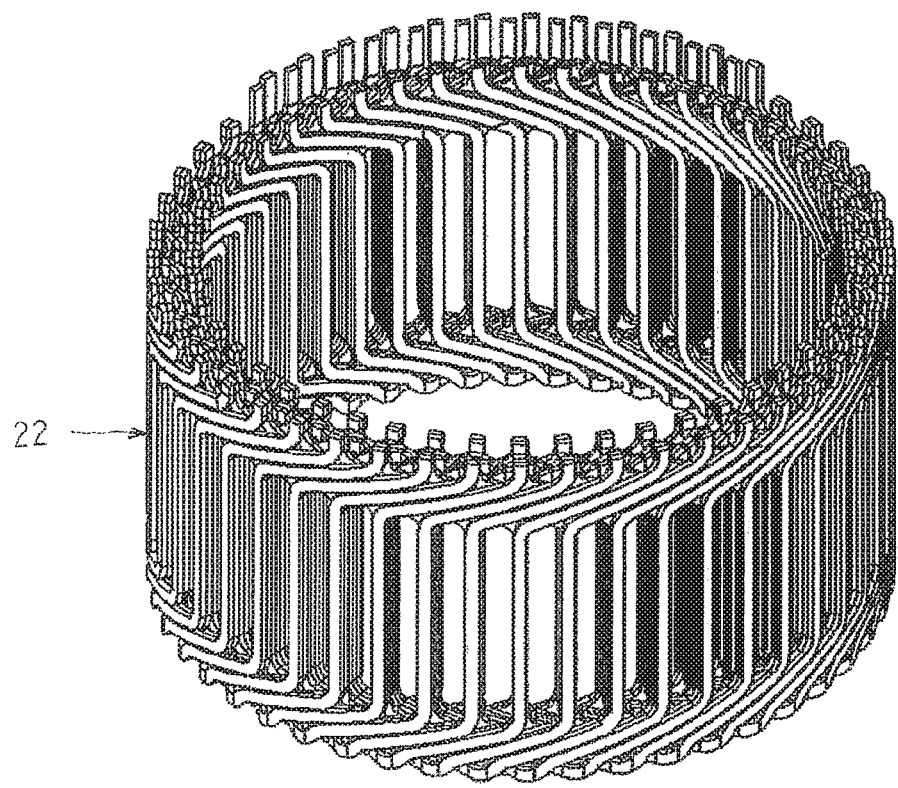
FIG. 11 is an oblique projection that shows the armature winding in the rotary electric machine according to Embodiment 1 of the present invention.
Figure 12:
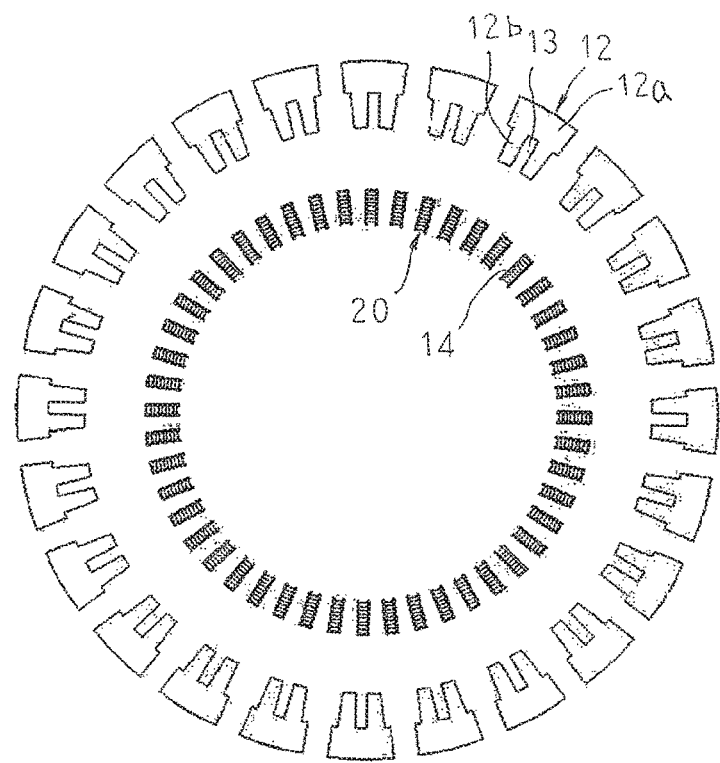
FIG. 12 is a diagram that explains a method for assembling the armature in the rotary electric machine according to Embodiment 1 of the present invention.
Figure 13:
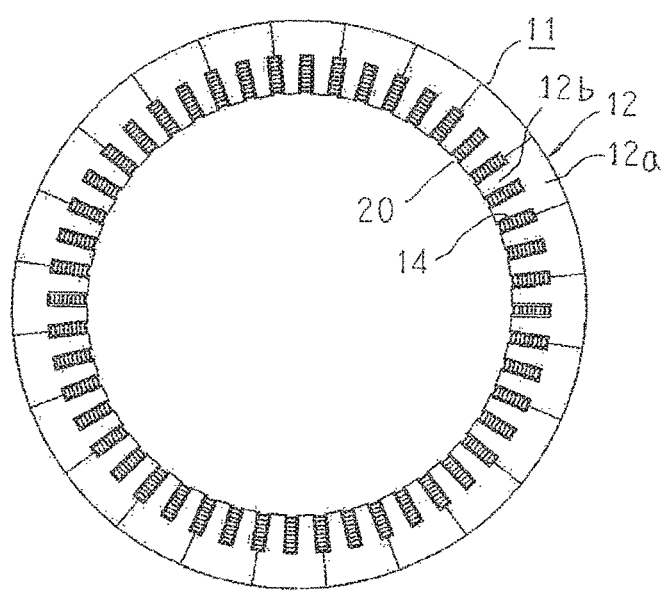
FIG. 13 is a diagram that explains the method for assembling the armature in the rotary electric machine according to Embodiment 1 of the present invention.

Next, a method for assembling the armature 10 will be explained with reference to FIGS. 9A through 13. FIGS. 9A, 9B, 9C, 10A, 10B, and 10C show diagrams that explain a method for assembling the armature winding in the rotary electric machine according to Embodiment 1 of the present invention, FIG. 11 is an oblique projection that shows the armature winding in the rotary electric machine according to Embodiment 1 of the present invention, and FIGS. 12 and 13 are diagrams that explains a method for assembling the armature in the rotary electric machine according to Embodiment 1 of the present invention. Moreover, for simplicity, coil end portions are depicted rectilinearly in FIGS. 9A, 9B, and 9C, and the armature winding is depicted using only rectilinear portions in FIGS. 12 and 13. To facilitate explanation, forty-eight two-lane winding bodies 22 are designated "first two-lane winding body 221", "second two-lane winding body 222", "third two-lane winding body 223", etc., through "forty-eighth two-lane winding body 2248", in order of mounting. Furthermore, a longitudinal direction, a short-side direction, and a long-side direction of the first through fourth rectilinear portions 22a through 22d are designated an axial direction, a radial direction, and a circumferential direction.

Figure 9A:
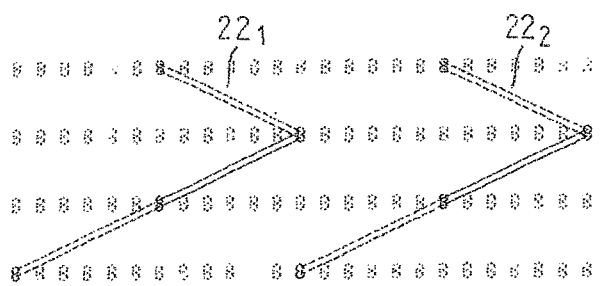
FIGS. 9A, 9B and 9B show diagrams that explain a method for assembling the armature winding in the rotary electric machine according to Embodiment 1 of the present invention.
Figure 9B:
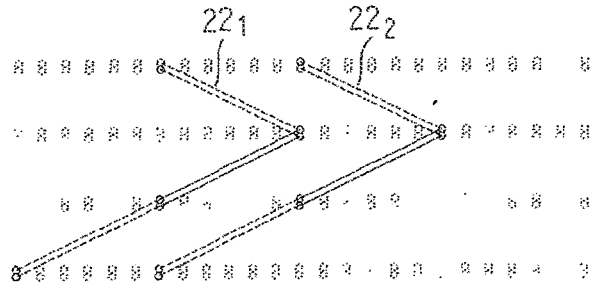
Figure 9C:
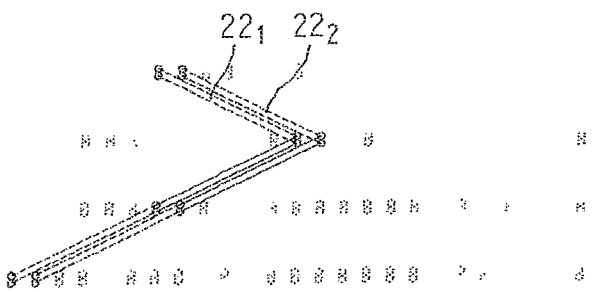

First, as shown in FIG. 9A, the second two-lane winding body 222 is disposed on a first circumferential side of the first two-lane winding body 221 such that its axial position is aligned with the axial position of the first two-lane winding body 221. Next, as shown in FIG. 9B, the second two-lane winding body 222 is moved in the second circumferential direction without changing the axial position thereof. Next, as shown in FIG. 9C, the second two-lane winding body 222 is mounted to the first two-lane winding body 221. Next, the third two-lane winding body 223 is mounted to the second two-lane winding body 222. This procedure is repeated to assemble from the first two-lane winding body 221 through the forty-seventh two-lane winding body 2247, producing a C-shaped intermediate assemblage 21.

Next, the intermediate assemblage 21 is spread until it is wider than a circumferential width of the forty-eighth two-lane winding body 2248 between the first two-lane winding body 221 and the forty-seventh two-lane winding body 2247. Then, as shown in FIG. 10A, the forty-eighth two-lane winding body 2248 is disposed inside the widened opening of the intermediate assemblage 21. Next, as shown in FIG. 10B, the forty-eighth two-lane winding body 2248 is mounted to the forty-seventh two-lane winding body 2247. As shown in FIG. 10C, the opening of the intermediate winding body 21A is then closed, and the first two-lane winding body 221 and the forty-eighth two-lane winding body 2248 are fitted together, to assemble an annular armature winding 20.

As shown in FIG. 11, the armature winding 20 that is assembled in this manner is configured by arranging forty-eight two-lane winding bodies 22 circumferentially at a pitch of one slot. Eight first through fourth rectilinear portions 22a, 22b, 22c, and 22d are lined up in a single column radially, and forty-eight such columns are arranged circumferentially at a pitch of one slot. The first coil end portions 22e and the third coil end portions 22g are arranged circumferentially to constitute first coil ends, and the second coil end portions 22f are arranged circumferentially to constitute second coil ends. The winding ends 221h and 222h that constitute the winding ends 22h each project axially outward in a vicinity of the second coil ends, and are arranged on a radially outer side of the second coil ends at a pitch of one slot circumferentially, and the winding ends 221j and 222j that constitute the winding ends 22j each project axially outward in the vicinity of the second coil ends, and are arranged on a radially inner side of the second coil ends at a pitch of one slot circumferentially.

Next, insulators 14 that are formed so as to have an angular C shape are mounted to each of the columns of the first through fourth rectilinear portions 22a, 22b, 22c, and 22d of the armature winding 20 from radially outside. Then, as shown in FIG. 12, twenty-four core blocks 12 are disposed radially outside the armature winding 20 such that the teeth 12b are positioned on a radially outer side between the rows of the first through fourth rectilinear portions 22a, 22b, 22c, and 22d. Next, each of the core blocks 12 is moved radially inward to insert the teeth 12b between the columns of first through fourth rectilinear portions 22a, 22b, 22c, and 22d. As shown in FIG. 13, side surfaces of the core back portions 12a of the circumferentially adjacent core blocks 12 are butted together to assemble the annular armature core 11. The armature winding 20 is simultaneously mounted to the armature core 11. Alternating-current connection is then applied to the armature winding 20 to produce the armature 10.

In Embodiment 1, because the armature winding 20 can be produced by assembling the forty-eight two-lane winding bodies 22 circumferentially in this manner, the complicated step of interweaving wave-wound coils in Patent Literature 3, which uses wave-wound coils, is no longer required, increasing productivity.

The two-lane winding bodies 22 are produced by stacking and winding the flat conductor wires 19. The radial positions of the winding ends 221h and 221j of the radially outer winding body 221 and the winding ends 222h and 222j of the radially inner winding body 222 are different. Consequently, because the two-lane winding bodies 22 can be arranged at a pitch of one slot without the winding ends 221h and the winding ends 222h interfering, and without the winding ends 221j and the winding ends 222j interfering, increases in radial dimensions of the second coil ends are suppressed. Furthermore, because the end portions of the winding ends 221h and 222h can be disposed together, and the end portions of the winding ends 221j and 222j can be disposed together, so as to be stacked in a radial direction, joining operations are simplified, and joint portions can also be reduced in size. In addition, the bending radius at the vertex portions of the first through third coil end portions 22e, 22f, and 22g is reduced compared to Patent Literature 1, which uses hexagonal coils, enabling the radial dimensions and axial dimensions of the first and second coil ends to be reduced.

The winding ends 221h and 222h for connecting the radially outer winding bodies 221 and the radially inner winding bodies 222 are arranged circumferentially around a radially outer side of the first coil ends, and the winding ends 221j and 222j are arranged circumferentially around a radially inner side of the first coil ends. Thus, because crossover wires that pass axially outside the first coil ends are no longer required, axial dimensions of the armature 10 can be reduced, and reductions in winding resistance can also be achieved, compared to Patent Literature 1. Furthermore, because the number of welds in the armature winding 20 is reduced compared to Patent Literature 2, which uses coil segments, takt time during production can be made shorter, and the occurrence of quality problems can also be suppressed.

Figure 14:
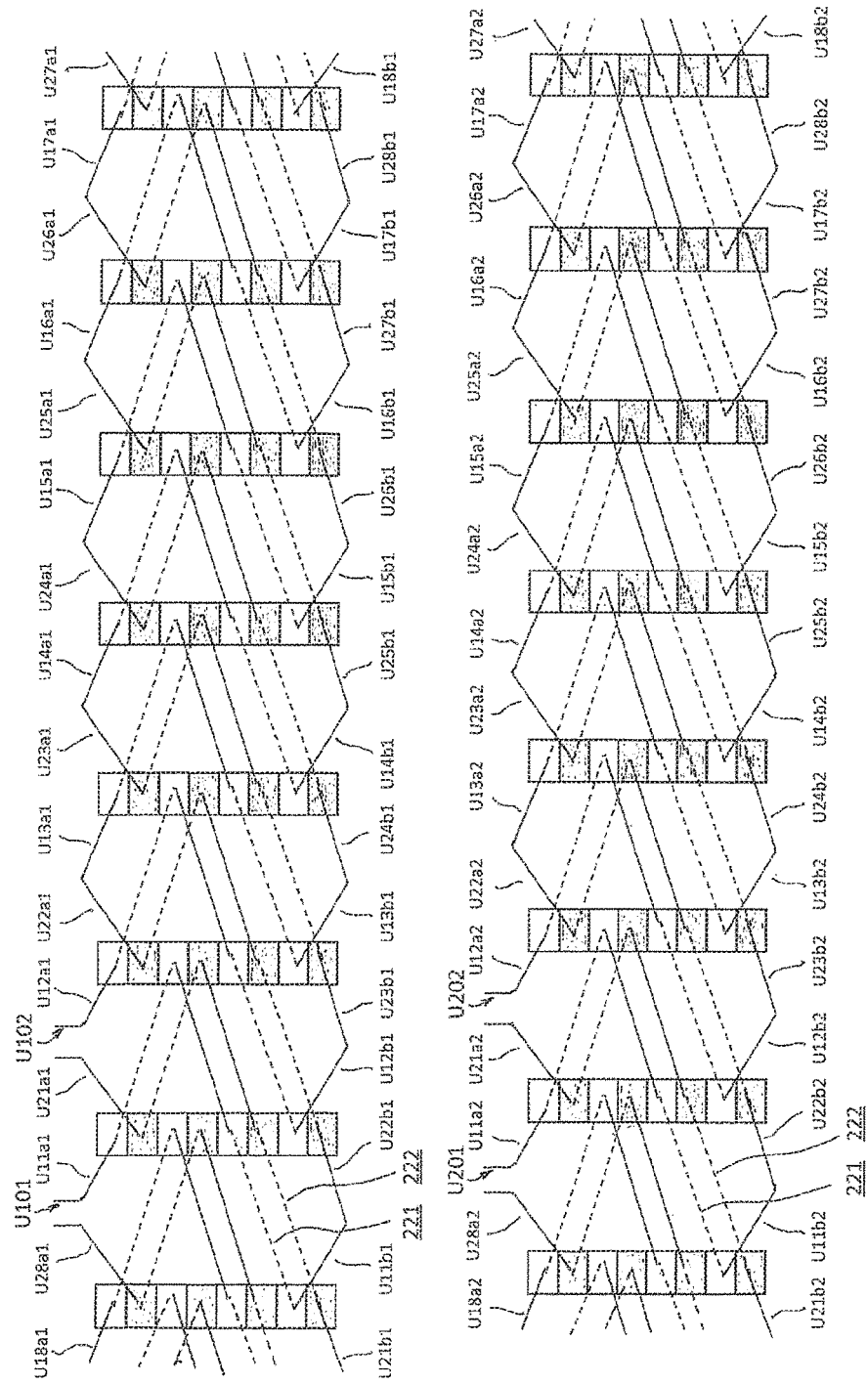
FIG. 14 is a diagram that explains a method for connecting a U-phase coil of the armature winding in the rotary electric machine according to Embodiment 1 of the present invention.
Figure 15:
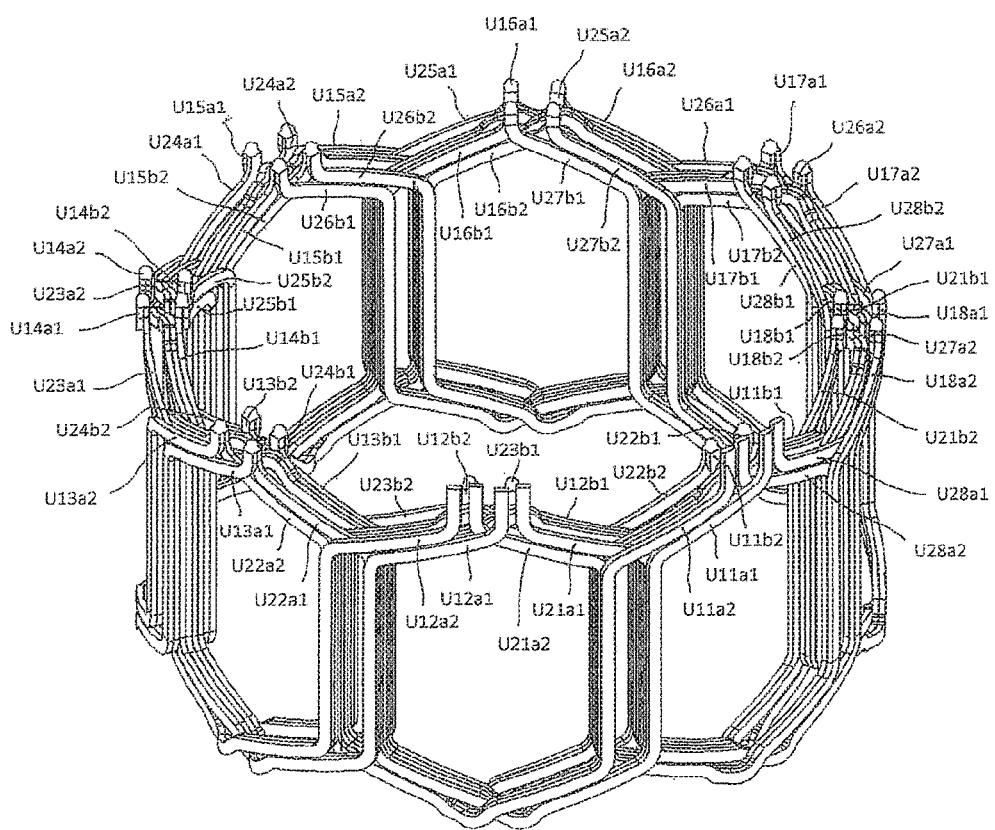
FIG. 15 is an oblique projection that shows the U-phase coil of the armature winding in the rotary electric machine according to Embodiment 1 of the present invention.
Figure 16:
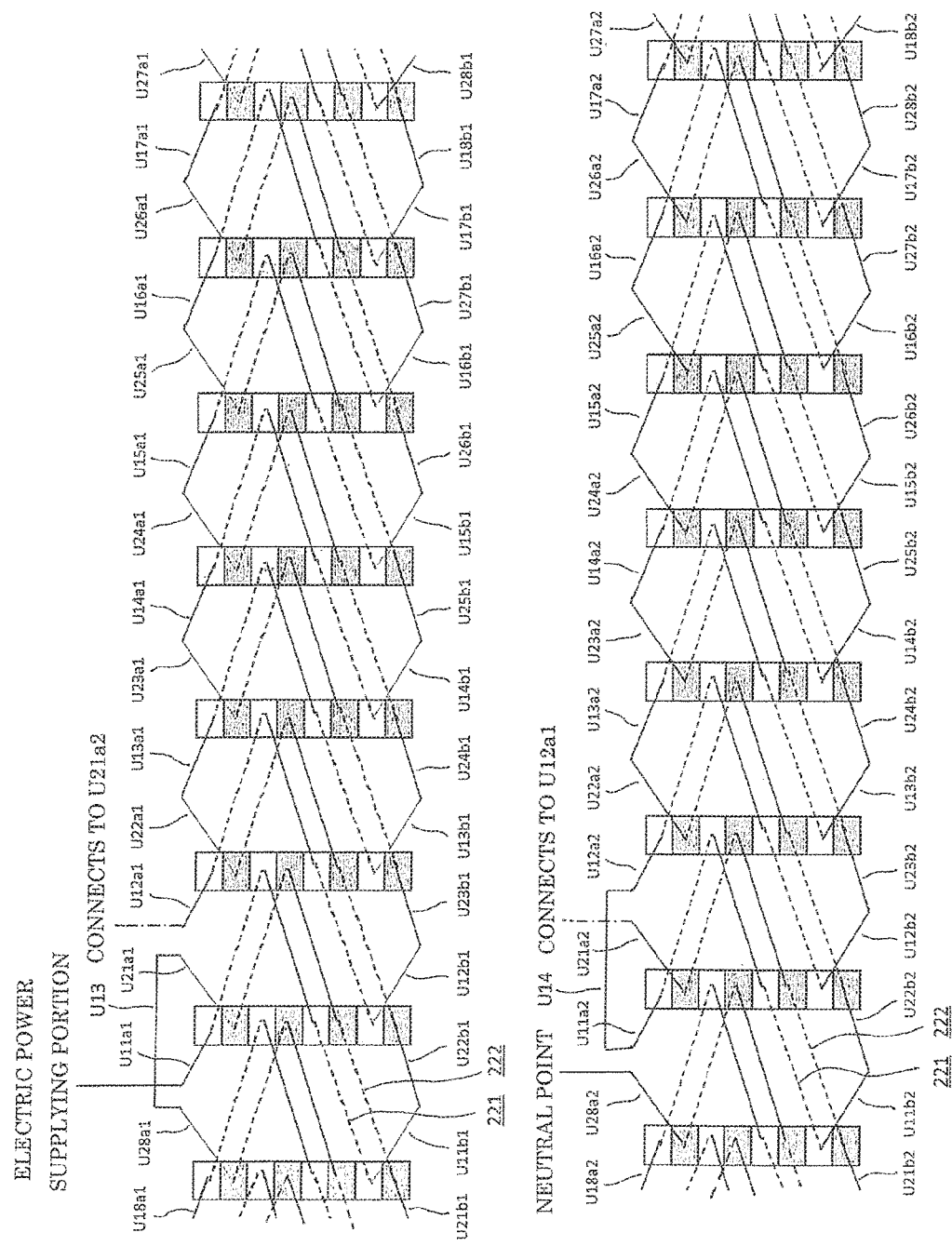
FIG. 16 is a diagram that explains the method for connecting the U-phase coil of the armature winding in the rotary electric machine according to Embodiment 1 of the present invention.
Figure 17:
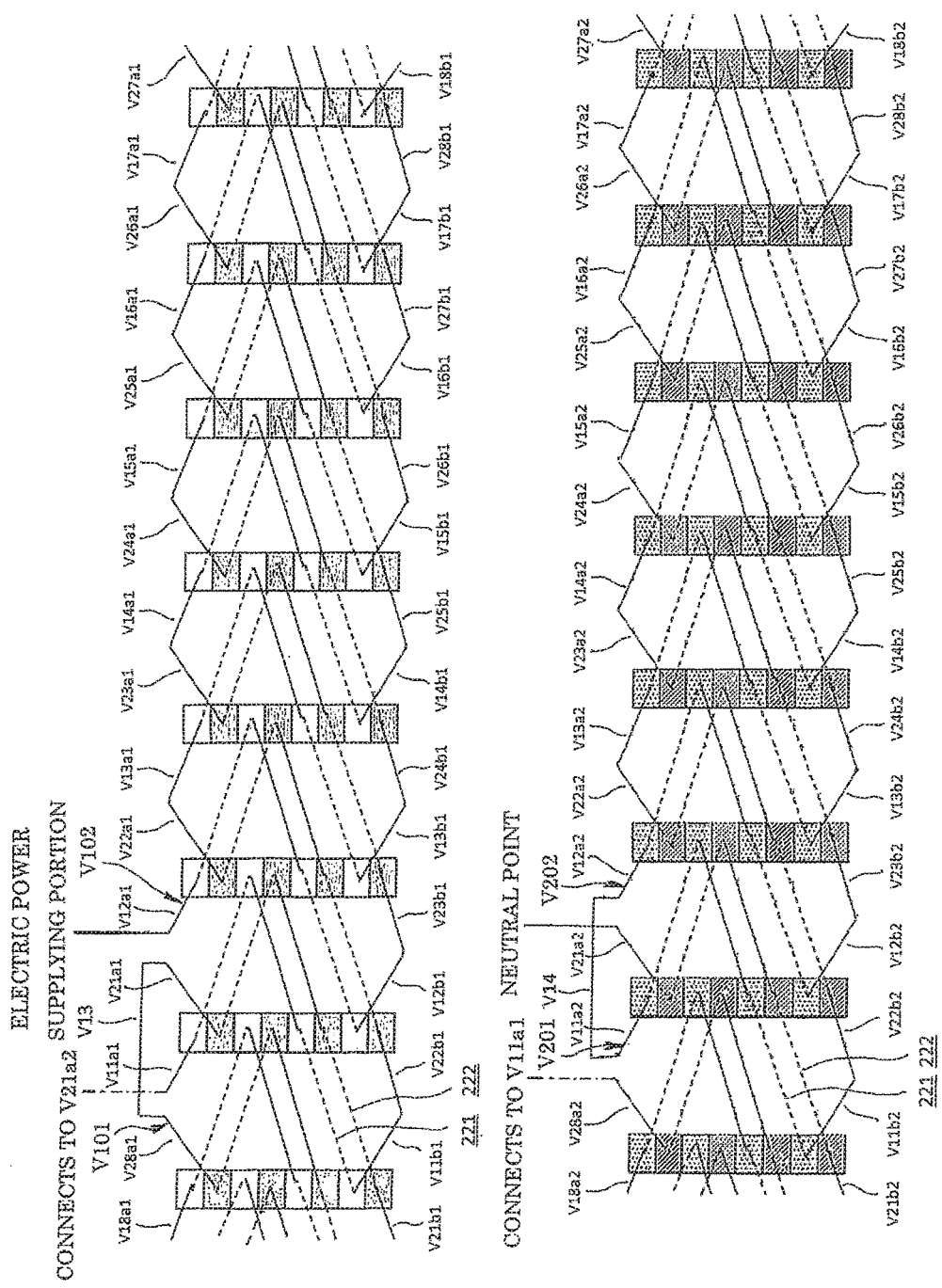
FIG. 17 is a diagram that explains a method for connecting a V-phase coil of the armature winding in the rotary electric machine according to Embodiment 1 of the present invention.
Figure 18:
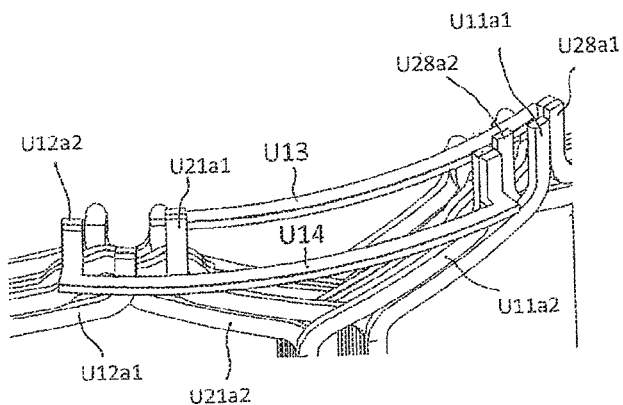
FIG. 18 is a partial oblique projection that shows a vicinity of electric power supplying portions of the U-phase coil of the armature winding in the rotary electric machine according to Embodiment 1 of the present invention.
Figure 19:
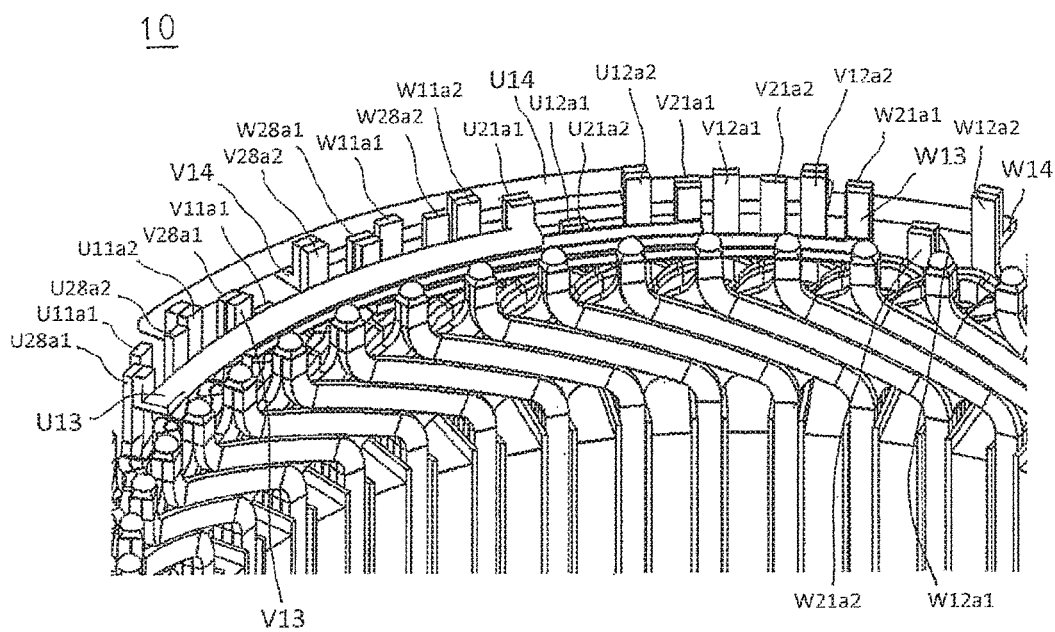
FIG. 19 is a partial oblique projection that shows a vicinity of electric power supplying portions of the armature winding in the rotary electric machine according to Embodiment 1 of the present invention.

Next, a method for connecting the armature winding 20 will be explained with reference to FIGS. 14 through 19. FIG. 14 is a diagram that explains a method for connecting a U-phase coil of the armature winding in the rotary electric machine according to Embodiment 1 of the present invention, FIG. 15 is an oblique projection that shows the U-phase coil of the armature winding in the rotary electric machine according to Embodiment 1 of the present invention, FIG. 16 is a diagram that explains the method for connecting the U-phase coil of the armature winding in the rotary electric machine according to Embodiment 1 of the present invention, FIG. 17 is a diagram that explains a method for connecting a V-phase coil of the armature winding in the rotary electric machine according to Embodiment 1 of the present invention, FIG. 18 is a partial oblique projection that shows a vicinity of electric power supplying portions of the U-phase coil of the armature winding in the rotary electric machine according to Embodiment 1 of the present invention, and FIG. 19 is a partial oblique projection that shows a vicinity of electric power supplying portions of the armature winding in the rotary electric machine according to Embodiment 1 of the present invention.

Here, in FIG. 14, U11a1, U12a1, U13a1, etc., through U18a1 and U11b1, U12b1, U13b1, etc., through U18b1 are winding ends 221h and 221i of outer winding bodies 221 of two-lane winding bodies 22 that constitute a U1 phase that is mounted into a first slot group that includes slots 13 at Slot Numbers (1+6n), where n is an integer from 0 through 7, and U21a1, U22a1, U23a1, etc., through U28a1 and U21b1, U22b1, U23b1, etc., through U28b1 are winding ends 222h and 222i of inner winding bodies 222 of the two-lane winding bodies 22 that constitute a U1 phase that is mounted into the first slot group that includes slots 13 at Slot Numbers (1+6n), where n is an integer from 0 through 7.

In FIG. 14, U11a2, U12a2, U13a2, etc., through U18a2 and U11b2, U12b2, U13b2, etc., through U18b2 are winding ends 221h and 221i of outer winding bodies 221 of two-lane winding bodies 22 that constitute a U2 phase that is mounted into a second slot group that includes slots 13 at Slot Numbers (2+6n), where n is an integer from 0 through 7, and U21a2, U22a2, U23a2, etc., through U28a2 and U21b2, U22b2, U23b2, etc., through U28b2 are winding ends 222h and 222i of inner winding bodies 222 of the two-lane winding bodies 22 that constitute a U2 phase that is mounted into the second slot group that includes slots 13 at Slot Numbers (2+6n), where n is an integer from 0 through 7.

Two-lane winding bodies 22 are also mounted into a third slot group that includes slots 13 at Slot Numbers (3+6n) to constitute a V1 phase, and two-lane winding bodies 22 are mounted into a fourth slot group that includes slots 13 at Slot Numbers (4+6n) to constitute a V2 phase. Two-lane winding bodies 22 are also mounted into a fifth slot group that includes slots 13 at Slot Numbers (5+6n) to constitute a W1 phase, and two-lane winding bodies 22 are mounted into a slot sixth group that includes slots 13 at Slot Numbers (6+6n) to constitute a W2 phase.

As shown in FIGS. 14 and 15, U11b1 and U22b1, U22a1 and U13a1, U13b1 and U24b1, U24a1 and U15a1, U15b1 and U26b1, U26a1 and U17a1, and U17b1 and U28b1 are first connected to obtain a winding group U101. Similarly, U12b1 and U23b1, U23a1 and U14a1, U14b1 and U25b1, U25a1 and U16a1, U16b1 and U27b1, U27a1 and U18a1, U18b1 and U21b1 are connected to obtain a winding group U102. The winding groups U101 and U102 are each configured by alternately connecting in series radially outer winding bodies 221 and radially inner winding bodies 222 that are separated by 180 electrical degrees among the two-lane winding bodies 22 that are mounted into the first slot group, i.e., that share slots 13.

Next, U11b2 and U22b2, U22a2 and U13a2, U13b2 and U24b2, U24a2 and U15a2, U15b2 and U26b2, U26a2 and U17a2, and U17b2 and U28b2 are connected to obtain a winding group U201. Similarly, U12b2 and U23b2, U23a2 and U14a2, U14b2 and U25b2, U25a2 and U16a2, U16b2 and U27b2, U27a2 and U18a2, U18b2 and U21b2 are connected to obtain a winding group U202. The winding groups U201 and U202 are each configured by alternately connecting in series radially outer winding bodies 221 and radially inner winding bodies 222 that are separated by 180 electrical degrees among the two-lane winding bodies 22 that are mounted into the second slot group, i.e., that share slots 13.

Next, as shown in FIG. 16, U21a1 and U28a1 are connected, U11a2 and U12a2 are connected, and U12a1 and U21a2 are connected, to obtain a U-phase coil in which the four winding groups U101, U102, U201, and U202 are connected in series. Here, as shown in FIG. 18, U21a1 and U28a1, and U11a2 and U12a2, are separated in a circumferential direction, and are connected using busbars U13 and U14, respectively. Because U12a1 and U21a2 are led out to a position that is in close proximity in a circumferential direction, they are connected directly. U11a1 becomes an electric power supplying portion of the U-phase coil, and U28a2 becomes a neutral point of the U-phase coil. The busbars U13 and U14 are produced by bending sheet metal and applying an insulating surface coating, but the conductor wire 19 that constitutes the two-lane winding bodies 22 may alternatively be used.

Moreover, although not shown, a W-phase coil is also configured by connecting two-lane winding bodies 22 that are mounted into the fifth slot group and the sixth slot group in a similar manner to the U-phase coil.

As shown in FIG. 17, two-lane winding bodies 22 that are mounted into the third slot group and the fourth slot group are connected such that V12a1 becomes an electric power supplying portion of a V-phase coil, and V21a2 becomes a neutral point thereof. Moreover, V13 and V14 are busbars that connect V21a1 and W28a1, and W11a2 and W12a2, and W13 and W14 are busbars that connect W21a1 and W28a1, and W11a2 and W12a2.

By adopting a connecting construction of this kind, the electric power supplying portions and the neutral points of the U-phase coil, the V-phase coil, and the W-phase coil can be concentrated in a narrow circumferential range, as shown in FIG. 19.

Figure 20:
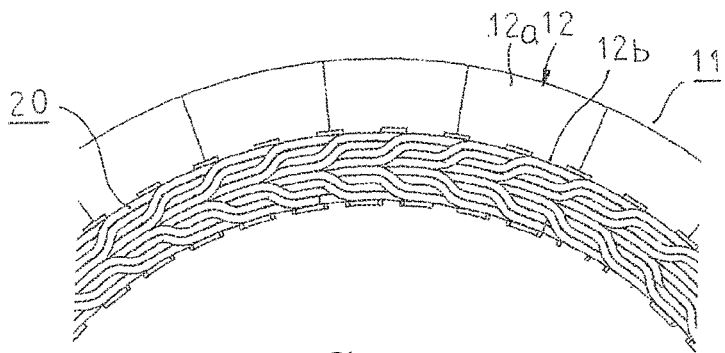
FIG. 20 is a partial end elevation that shows second coil ends of the armature winding in the rotary electric machine according to Embodiment 1 of the present invention.
Figure 21:
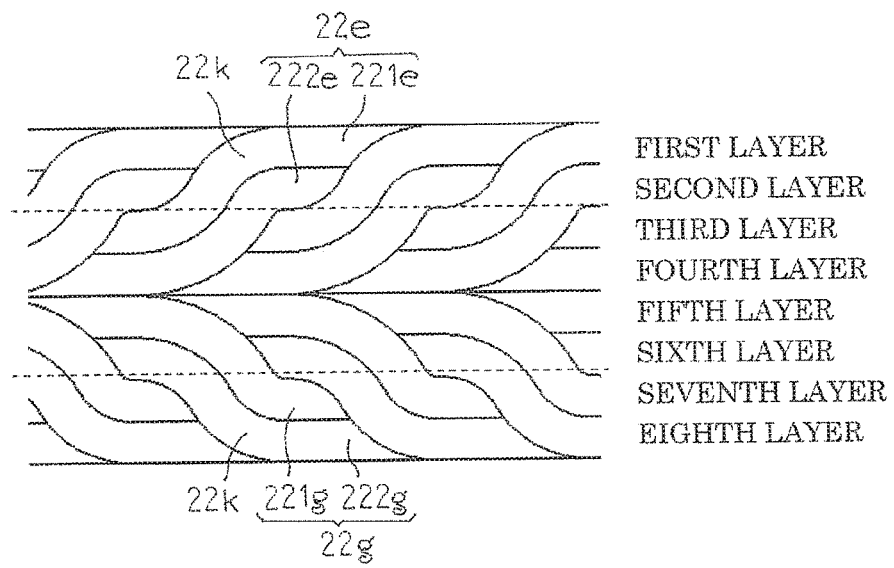
FIG. 21 is a partial end elevation that schematically shows second coil ends of the armature winding in the rotary electric machine according to Embodiment 1 of the present invention.

Next, insulation of the coil ends in the armature winding 20 that is configured in this manner will be explained with reference to FIGS. 20 through 22. FIG. 20 is a partial end elevation that shows second coil ends of the armature winding in the rotary electric machine according to Embodiment 1 of the present invention, FIG. 21 is a partial end elevation that schematically shows second coil ends of the armature winding in the rotary electric machine according to Embodiment 1 of the present invention, and FIG. 22 is a partial end elevation that schematically shows second coil ends of a conventional armature winding.

As shown in FIG. 20, in this armature winding 20, the first coil end portions 22e and the third coil end portions 22g are arranged circumferentially to constitute first coil ends. In other words, in the first coil ends of the armature winding 20, as shown in FIG. 21, two conductor wires 19 that have emerged from the third layer and the fourth layer from a radially outer side of a first slot are lane changed by 2d radially outward by the crank portions 22k, and are inserted into the first layer and the second layer from a radially outer side of a slot that is separated by an angular spacing of six slots in a first circumferential direction from the first slot, and two conductor wires 19 that have emerged from the fifth layer and the sixth layer from a radially outer side of the first slot are lane changed by 2d radially inward by the crank portions 22k, and are inserted into the seventh layer and the eighth layer from a radially outer side of a slot that is separated by an angular spacing of six slots in a second circumferential direction from the first slot. Thus, in the second coil ends, there are two contacting portions between different-phase coils, i.e., between the conductor wires 19 in the second layer and the conductor wires 19 in the third layer, and between the conductor wires 19 in the sixth layer and the conductor wires 19 in the seventh layer.

Figure 22:
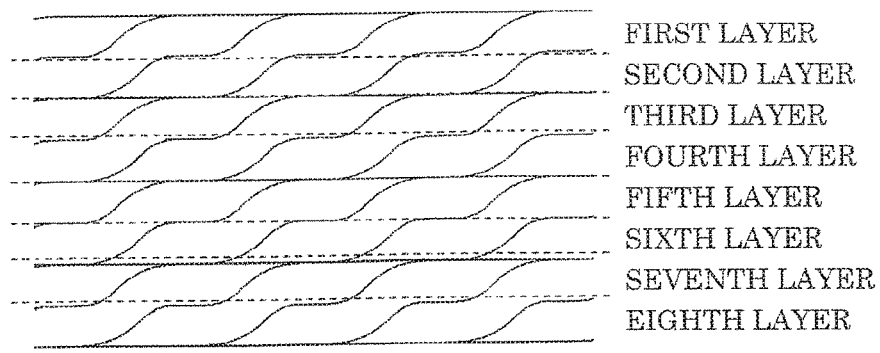
FIG. 22 is a partial end elevation that schematically shows second coil ends of a conventional armature winding.

In contrast to that, in the case of distributed windings that use wave windings or U-shaped coil segments, as shown in FIG. 22, different-phase coils contact between the conductor wires in all layers.

Thus, according to Embodiment 1, because the two-lane winding bodies 22 are configured such that the conductor wires 19 are wound so as to cycle through three consecutive slots 13 so as to be separated by an angular pitch of six slots in a circumferential direction, positions at which different-phase coils contact in the coil ends are reduced, enabling the risk that dielectric breakdown may arise when high voltages are applied to be suppressed.

The radially outer winding bodies 221 and the radially inner winding bodies 222 that are separated by 180 electrical degrees are alternately connected in series, and the three sets of radially outer winding bodies 221 and radially inner winding bodies 222 that are inserted into identical slots 13 are connected consecutively. Thus, because the electric potential difference between the conductor wires 19 that are inserted into the identical slots 13 is at most half the phase voltage, insulation performance that is required of the conductor wires 19 is reduced, and it is not necessary to increase the film thickness of the insulating coating on the conductor wires 19 excessively.

Because conductor wires that have a rectangular cross section are used as the conductor wires 19, space factor is increased.

Embodiment 2

Figure 23:
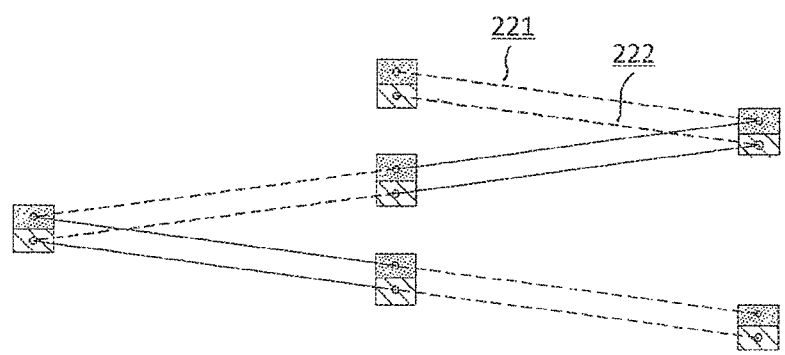
FIG. 23 is an end elevation that schematically shows a two-lane winding body that constitutes part of an armature winding in a rotary electric machine according to Embodiment 2 of the present invention.

FIG. 23 is an end elevation that schematically shows a two-lane winding body that constitutes part of an armature winding in a rotary electric machine according to Embodiment 2 of the present invention. Moreover, coil end portions are represented as straight lines in FIG. 23.

In FIG. 23, a two-lane winding body 22A is produced into a coil pattern in which two conductor wires 19 are wound into an edgewise winding so as to be stacked in a short-side direction, and in a third slot, a first slot, and a second slot that line up consecutively in a circumferential direction so as to be separated by an angular pitch of six slots, are inserted sequentially into the first slot, the second slot, the first slot, the third slot, the first slot, and the second slot.

Moreover, the rest of the configuration is configured in a similar or identical manner to that of Embodiment 1 above except that the two-lane winding body 22A is used instead of the two-lane winding body 22.

In Embodiment 2, two-lane winding bodies 22A are used that are produced by winding two stacked conductor wires 19 into a coil pattern that is similar or identical to that of the two-lane winding bodies 22, and then continuing to wind them into a coil pattern that is inserted into the first slot and the second slot. Consequently, similar or identical effects to those in Embodiment 1 above are also exhibited in Embodiment 2.

Now, the two-lane winding bodies 22A are produced by winding two stacked conductor wires into a first coil pattern that is inserted sequentially into the first slot and the second slot, and then iterating a second coil pattern once in which they are inserted sequentially into the first slot, the third slot, the first slot, and the second slot, but the number of iterations of the second coil pattern may alternatively be two or more. In other words, if two-lane winding bodies are used in which the number of iterations of the second coil pattern is m times, where m is an integer that is greater than or equal to 1, then an armature winding in which the number of rectilinear portions that are arranged in single columns radially is (4+8m) can be configured easily.

Embodiment 3

Figure 24:
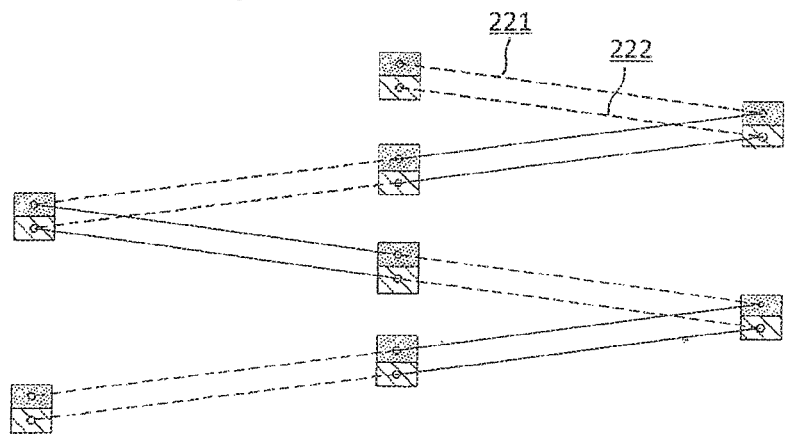
FIG. 24 is an end elevation that schematically shows a two-lane winding body that constitutes part of an armature winding in a rotary electric machine according to Embodiment 3 of the present invention.

FIG. 24 is an end elevation that schematically shows a two-lane winding body that constitutes part of an armature winding in a rotary electric machine according to Embodiment 3 of the present invention. Moreover, coil end portions are represented as straight lines in FIG. 24.

In FIG. 24, a two-lane winding body 22B is produced into a coil pattern in which two conductor wires 19 are wound into an edgewise winding so as to be stacked in a short-side direction, and in a third slot, a first slot, and a second slot that line up consecutively in a circumferential direction so as to be separated by an angular pitch of six slots, are inserted sequentially into the first slot, the second slot, the first slot, the third slot, the first slot, the second slot, the first slot, and the third slot.

Moreover, the rest of the configuration is configured in a similar or identical manner to that of Embodiment 1 above except that the two-lane winding body 22B is used instead of the two-lane winding body 22.

In Embodiment 2, two-lane winding bodies 22B are used that are produced by winding two stacked conductor wires 19 into a coil pattern that is similar or identical to that of the two-lane winding bodies 22, and then continuing to wind them into a coil pattern that is inserted into the first slot, the second slot, the first slot, and the third slot. Consequently, similar or identical effects to those in Embodiment 1 above are also exhibited in Embodiment 3.

Now, in the two-lane winding bodies 22 and 22B, the number of iterations of the coil pattern in which two stacked conductor wires are inserted sequentially into the first slot, the second slot, the first slot, and the third slot is one or two iterations, but the number of iterations of the coil pattern in question may alternatively be three or more. In other words, if two-lane winding bodies are used in which the number of iterations of the coil pattern in question is m times, then an armature winding in which the number of the rectilinear portions that are arranged in single columns radially is 8 m can be configured easily.

Embodiment 4

Figure 25:
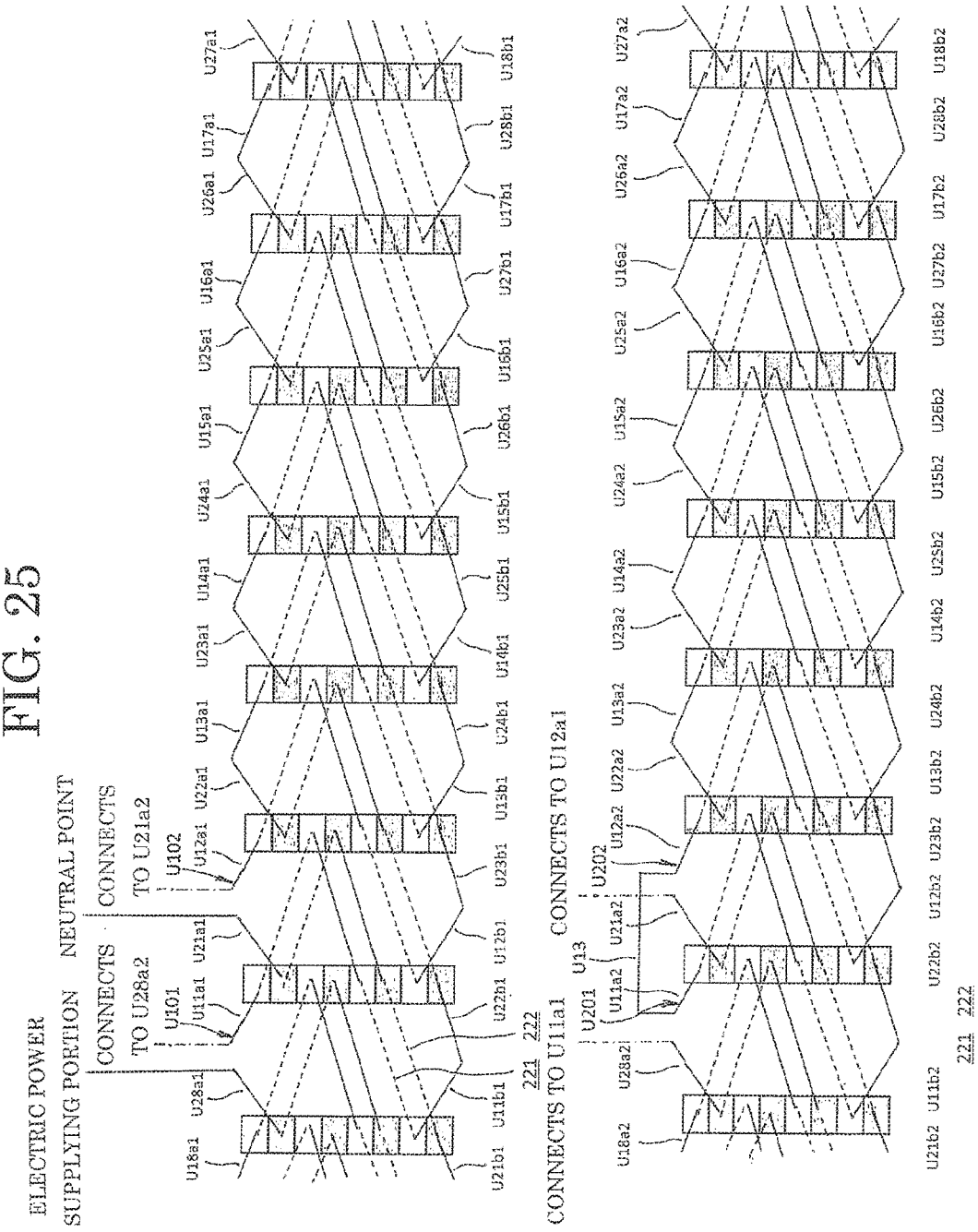
FIG. 25 is a diagram that explains a method for connecting a U-phase coil of an armature winding in a rotary electric machine according to Embodiment 4 of the present invention.
Figure 26:
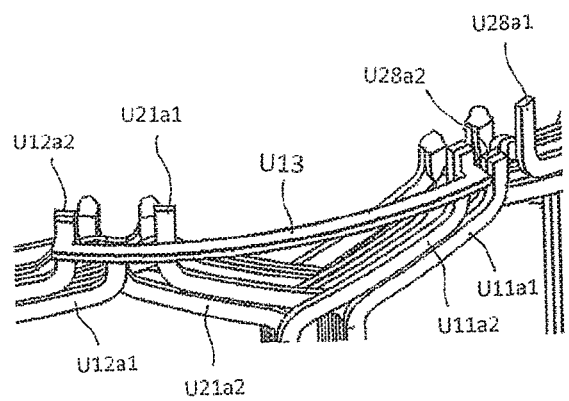
FIG. 26 is a partial oblique projection that shows a vicinity of electric power supplying portions of the U-phase coil of the armature winding in the rotary electric machine according to Embodiment 4 of the present invention.
Figure 27:
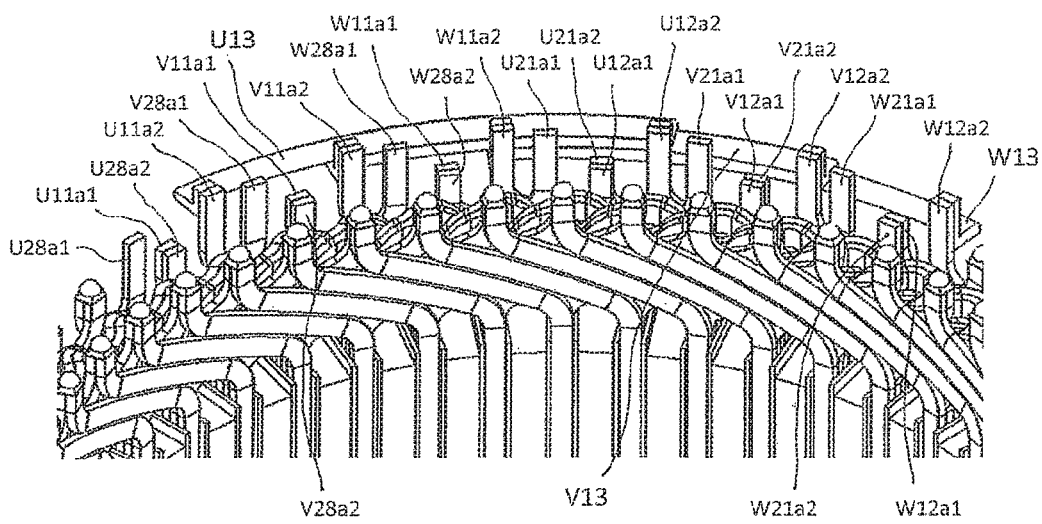
FIG. 27 is a partial oblique projection that shows a vicinity of electric power supplying portions of the armature winding in the rotary electric machine according to Embodiment 4 of the present invention.

FIG. 25 is a diagram that explains a method for connecting a U-phase coil of an armature winding in a rotary electric machine according to Embodiment 4 of the present invention, FIG. 26 is a partial oblique projection that shows a vicinity of electric power supplying portions of the U-phase coil of the armature winding in the rotary electric machine according to Embodiment 4 of the present invention, and FIG. 27 is a partial oblique projection that shows a vicinity of electric power supplying portions of the armature winding in the rotary electric machine according to Embodiment 4 of the present invention.

In Embodiment 4, as shown in FIG. 14, winding groups U101 and U102 are produced by alternately connecting in series radially outer winding bodies 221 and radially inner winding bodies 222 that are separated by 180 electrical degrees among two-lane winding bodies 22 that are mounted into a first slot group, i.e., that share slots. Winding groups U201 and U202 are produced by alternately connecting in series radially outer winding bodies 221 and radially inner winding bodies 222 that are separated by 180 electrical degrees among the two-lane winding bodies 22 that are mounted into a second slot group, i.e., that share slots. Next, as shown in FIGS. 25 and 26, U12a1 and U21a2 are connected directly, U11a1 and U28a2 are connected directly, and U11a2 and U12a2 are connected using a busbar U13, to obtain a U-phase coil in which the winding groups U101, U201, U202, and U102 are connected in series. U28a1 becomes an electric power supplying portion, and U21a1 becomes a neutral point. Moreover, a V-phase coil and a W-phase coil are also formed in a similar or identical manner.

In Embodiment 4, half of the radially outer winding bodies 221 and radially inner winding bodies 222 that are mounted into the first slot group are connected in series to configure the winding group U101, which is positioned near the electric power supplying portion of the U-phase coil, and a remaining half of the radially outer winding bodies 221 and radially inner winding bodies 222 that are mounted into the first slot group are connected in series to configure the winding group U102, which is positioned near the neutral point of the U-phase coil. Half of the radially outer winding bodies 221 and radially inner winding bodies 222 that are mounted into the second slot group are connected in series to configure the winding group U201, which is positioned near the electric power supplying portion of the U-phase coil, and a remaining half of the radially outer winding bodies 221 and radially inner winding bodies 222 that are mounted into the second slot group are connected in series to configure the winding group U202, which is positioned near the neutral point of the U-phase coil. Because the winding groups U101, U102, U201, and U202 are configured by connecting in series the winding bodies that share slots so as to be distributed half each between an electric power supplying portion side and a neutral point side in this manner, the number of busbars U13, V13, and W13 can be reduced to three, as shown in FIG. 27, enabling the number of parts to be reduced, and also enabling reductions in size of an armature 10A to be achieved.

Embodiment 5

Figure 28:
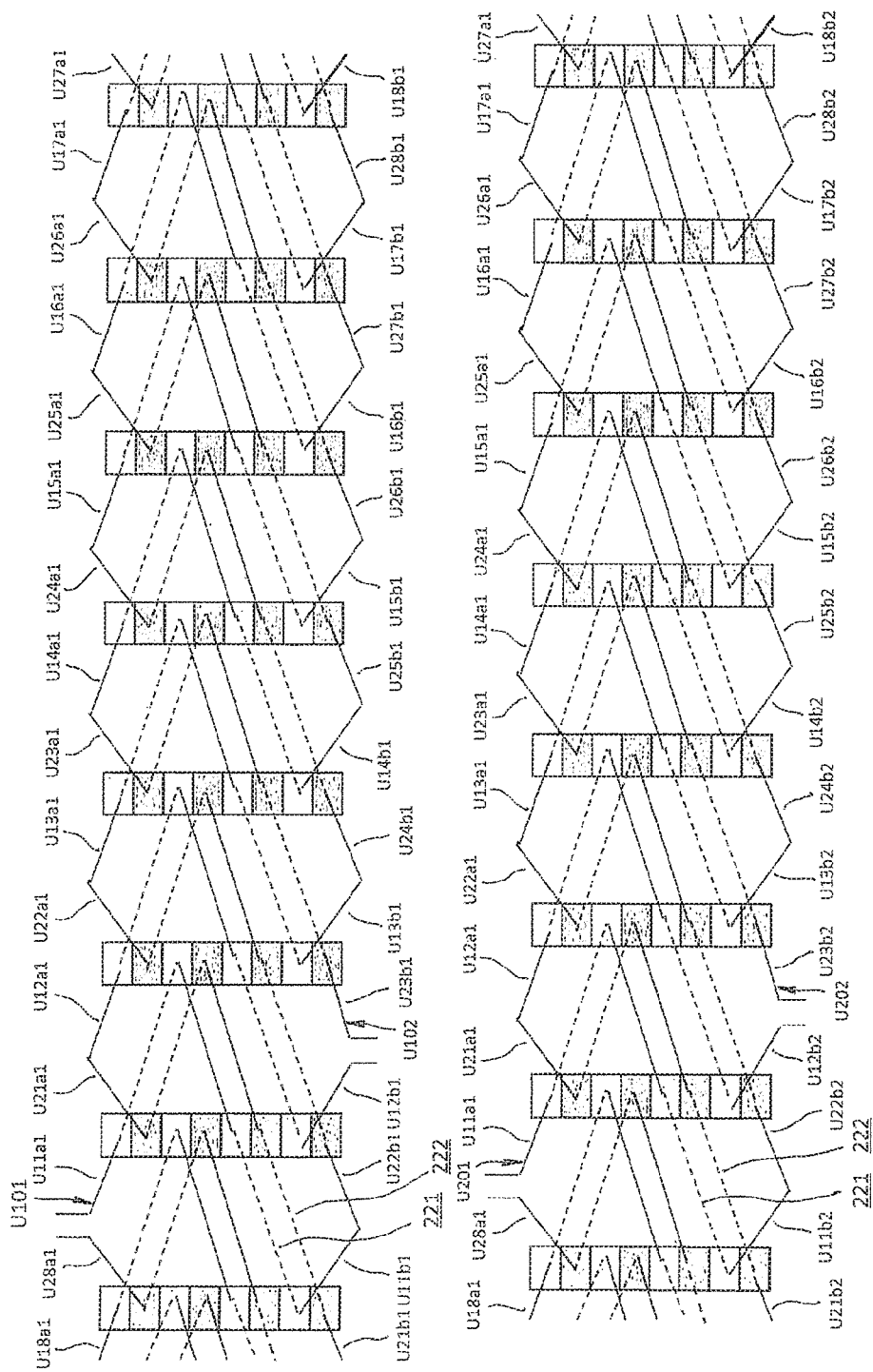
FIG. 28 is a diagram that explains a method for connecting a U-phase coil of an armature winding in a rotary electric machine according to Embodiment 5 of the present invention.
Figure 29:
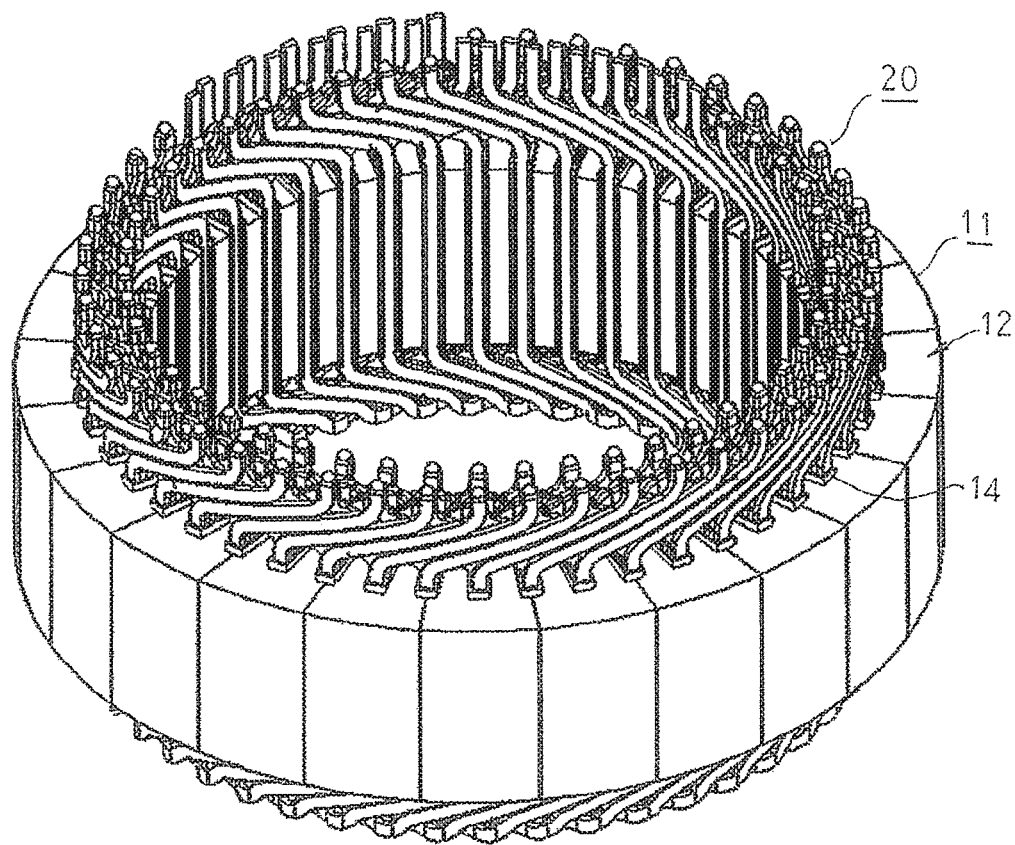
FIG. 29 is an oblique projection that shows an armature in the rotary electric machine according to Embodiment 5 of the present invention.

FIG. 28 is a diagram that explains a method for connecting a U-phase coil of an armature winding in a rotary electric machine according to Embodiment 5 of the present invention, and FIG. 29 is an oblique projection that shows an armature in the rotary electric machine according to Embodiment 5 of the present invention.

In Embodiment 5, as shown in FIG. 14, a winding group U101 is first produced by alternately connecting in series radially outer winding bodies 221 and radially inner winding bodies 222 that are separated by 180 electrical degrees among two-lane winding bodies 22 that are mounted into a first slot group. A winding group U201 is produced by alternately connecting in series radially outer winding bodies 221 and radially inner winding bodies 222 that are separated by 180 electrical degrees among two-lane winding bodies 22 that are mounted into a second slot group. Next, as shown in FIG. 28, U12a1 and U21a1, U21b1 and U18b1, U18a1 and U27a1, U27b1 and U16b1, U16a1 and U25a1, U25b1 and U14b1, and U14a1 and U23a1 are connected to produce a winding group U102 that has U12b1 and U23b1 as winding ends. Similarly, U12a2 and U21a2, U21b2 and U18b2, U18a2 and U27a2, U27b2 and U16b2, U16a2 and U25a2, U25b2 and U14b2, and U14a2 and U23a2 are connected to obtain a winding group U202 that has U12b2 and U23b2 as winding ends. Moreover, a V-phase coil and a W-phase coil are also formed in a similar or identical manner.

According to Embodiment 5, as shown in FIG. 29, twelve first winding ends of twelve winding groups that constitute the U-phase coil, the V-phase coil, and the W-phase coil are arranged so as to line up circumferentially around a radially inner side of the coil ends, and twelve second winding ends are arranged so as to line up circumferentially around a radially outer side of the coil ends. An armature 10B that is configured in this manner can also be applied to rotary electric machines that structurally do not have any extra space radially outside the armature.

Moreover, in each of the above embodiments, the winding bodies are produced using conductor wire that has an oblong cross section, but the cross sectional shape of the conductor wire that constitutes the winding bodies is not limited to an oblong shape, and conductor wire that has a circular cross section may be used, for example.

In each of the above embodiments, first through fourth rectilinear portions are arranged in a single column radially inside the slots such that longitudinal directions of long sides of the oblong cross sections are oriented circumferentially, but the first through fourth rectilinear portions may be arranged in a single column radially inside the slots such that longitudinal directions of short sides of the oblong cross sections are oriented circumferentially.

In each of the above embodiments, an eight-pole forty-eight-slot rotary electric machine has been explained, but it goes without saying that the number of poles and the number of slots are not limited to eight poles and forty-eight slots. Furthermore, the slots are formed at a ratio of two slots per phase per pole, but the number of slots per phase per pole is not limited to two, and may be one, or may be three or greater.

In each of the above embodiments, the armature winding is a three-phase winding, the number of slots is formed at a ratio of two slots per phase per pole, and the spacing between the rectilinear portions of the winding bodies is set to an angular spacing of six slots, but the spacing between the rectilinear portions of the winding bodies is not limited to an angular spacing of six slots. If the armature winding is a three-phase winding, and the number of slots is formed at a ratio of one slot per phase per pole, for example, then the spacing between the rectilinear portions of the two-lane winding bodies becomes an angular pitch of three slots.

In each of the above embodiments, an armature for a rotary electric machine such as an electric motor or a generator has been explained, but similar or identical effects are also exhibited if the present invention is applied to an armature for a direct acting machine such as a linear motor. Moreover, the radial direction, the circumferential direction, and the axial direction in a rotary electric machine correspond to a slot depth direction, a direction of slot arrangement, and a slot longitudinal direction of a direct acting machine.

The invention claimed is:

1. An armature for an electric machine, said armature comprising:
an armature core in which a plurality of slots are arranged in a slot width direction; and
an armature winding that is mounted to said armature core,
wherein:
said armature winding comprises a plurality of two-lane winding bodies that are each constituted by two jointless continuous conductor wires that are coated with insulation;
said two-lane winding bodies are arranged at a pitch of one slot in a direction of slot arrangement such that said two conductor wires are disposed in the same three slots, said three slots being a third slot, a first slot, and a second slot that line up consecutively in said direction of slot arrangement at an angular spacing of p slots, where p is a natural number that is greater than or equal to 2;
said two conductor wires that constitute said two-lane winding bodies are stacked in a slot depth direction of said armature core;
said two-lane winding bodies include m of a coil pattern in which said two conductor wires that are stacked in said slot depth direction are inserted sequentially into said first slot, said second slot, said first slot, and said third slot, where m is a natural number that is greater than or equal to 1; and
m of said coil pattern line up in said slot depth direction.

2. The armature for an electric machine according to claim 1, wherein:
a radially outer winding body that is constituted by a conductor wire that is positioned on a slot bottom portion side of said two conductor wires that are stacked in said slot depth direction and a radially inner winding body that is constituted by a conductor wire that is positioned on a slot opening side of said two conductor wires that are stacked in said slot depth direction each comprise:
rectilinear portions that are housed in said first slot, said second slot, and said third slot; and
coil end portions that link together end portions of said rectilinear portions; and
said coil end portions comprise a crank portion at a top portion, said crank portion displacing in said slot depth direction housed positions of said rectilinear portions in said slot depth direction inside said first slot, said second slot, and said third slot by twice a slot depth direction thickness of said rectilinear portions.

3. The armature for an electric machine according to claim 1, wherein radially outer terminals and radially inner terminals of radially outer winding bodies that are constituted by conductor wires that are positioned on a slot bottom portion side of said two conductor wires that are stacked in said slot depth direction and radially inner winding bodies that are constituted by conductor wires that are positioned on a slot opening side of said two conductor wires that are stacked in said slot depth direction extend such that said radially outer terminals are inclined in opposite directions to each other in said direction of slot arrangement, and said radially inner terminals are inclined in opposite directions to each other in said direction of slot arrangement.

4. The armature for an electric machine according to claim 1, wherein:
said two-lane winding bodies comprise:

a radially outer winding body that is constituted by a conductor wire that is positioned on a slot bottom portion side of said two conductor wires that are stacked in said slot depth direction; and a radially inner winding body that is constituted by a conductor wire that is positioned on a slot opening side of said two conductor wires that are stacked in said slot depth direction;

said armature winding comprises 2n winding groups per phase, where n is a number of slots per phase per pole; and each of said winding groups is configured such that radially outer winding bodies and radially inner winding bodies that are separated by 180 electrical degrees among said radially outer winding bodies and said radially inner winding bodies are connected, and such that half of said radially outer winding bodies and said radially inner winding bodies that are disposed in identical slots among said slots are connected consecutively.

5. The armature for an electric machine according to claim 1, wherein:

said two-lane winding bodies comprise:

a radially outer winding body that is constituted by a conductor wire that is positioned on a slot bottom portion side of said two conductor wires that are stacked in said slot depth direction; and a radially inner winding body that is constituted by a conductor wire that is positioned on a slot opening side of said two conductor wires that are stacked in said slot depth direction;

said armature winding comprises 2n winding groups per phase, where n is a number of slots per phase per pole that is greater than or equal to 2;

each of said winding groups is configured such that radially outer winding bodies and radially inner winding bodies that are separated by 180 electrical degrees among said radially outer winding bodies and said radially inner winding bodies are connected, and such that half of said radially outer winding bodies and said radially inner winding bodies that share said slots are connected in series; and a first terminal of each of said winding groups is positioned near a slot bottom portion and a second terminal is positioned near a slot opening.

6. The armature for an electric machine according to claim 1, wherein:

said two-lane winding bodies comprise:

a radially outer winding body that is constituted by a conductor wire that is positioned on a slot bottom portion side of said two conductor wires that are stacked in said slot depth direction; and a radially inner winding body that is constituted by a conductor wire that is positioned on a slot opening side of said two conductor wires that are stacked in said slot depth direction;

said armature winding comprises 2n winding groups per phase, where n is a number of slots per phase per pole that is greater than or equal to 2;

each of said winding groups is configured such that radially outer winding bodies and radially inner winding bodies that are separated by 180 electrical degrees among said radially outer winding bodies and said radially inner winding bodies are connected, and such that half of said radially outer winding bodies and said radially inner winding bodies that share said slots are connected in series so as to be divided into a neutral point side and an electric power supplying portion side.

7. The armature for an electric machine according to claim 1, wherein a cross section of said conductor wire is rectangular.

8. An armature for an electric machine, said armature comprising:

an armature core in which a plurality of slots are arranged in a slot width direction; and an armature winding that is mounted to said armature core, wherein:

said armature winding comprises a plurality of two-lane winding bodies that are each constituted by two jointless continuous conductor wires that are coated with insulation;

said two-lane winding bodies are arranged at a pitch of one slot in a direction of slot arrangement such that said two conductor wires are disposed in a third slot, a first slot, and a second slot that line up consecutively in said direction of slot arrangement at an angular spacing of p slots, where p is a natural number that is greater than or equal to 2;

said two conductor wires that constitute said two-lane winding bodies are stacked in a slot depth direction of said armature core;

said two-lane winding bodies include m of a coil pattern in which said two conductor wires that are stacked in said slot depth direction are disposed sequentially into said first slot, said second slot, said first slot, and said third slot, where m is a natural number that is greater than or equal to 1; and m of said coil pattern line up in said slot depth direction, wherein:

a radially outer winding body that is constituted by a conductor wire that is positioned on a slot bottom portion side of said two conductor wires that are stacked in said slot depth direction and a radially inner winding body that is constituted by a conductor wire that is positioned on a slot opening side of said two conductor wires that are stacked in said slot depth direction each comprise:

rectilinear portions that are housed in said first slot, said second slot, and said third slot; and coil end portions that link together end portions of said rectilinear portions; and said coil end portions comprise a crank portion at a top portion, said crank portion displacing in said slot depth direction housed positions of said rectilinear portions in said slot depth direction inside said first slot, said second slot, and said third slot by twice a slot depth direction thickness of said rectilinear portions.

9. An armature for an electric machine, said armature comprising:

an armature core in which a plurality of slots are arranged in a slot width direction; and an armature winding that is mounted to said armature core, wherein:

said armature winding comprises a plurality of two-lane winding bodies that are each constituted by two jointless continuous conductor wires that are coated with insulation;

said two-lane winding bodies are arranged at a pitch of one slot in a direction of slot arrangement such that said two conductor wires are disposed in a third slot, a first slot, and a second slot that line up consecutively in said direction of slot arrangement at an angular spacing of p slots, where p is a natural number that is greater than or equal to 2;

said two conductor wires that constitute said two-lane winding bodies are stacked in a slot depth direction of said armature core;

said two-lane winding bodies include m of a coil pattern in which said two conductor wires that are stacked in said slot depth direction are disposed sequentially into said first slot, said second slot, said first slot, and said third slot, where m is a natural number that is greater than or equal to 1; and m of said coil pattern line up in said slot depth direction, wherein:

said two-lane winding bodies comprise:
- a radially outer winding body that is constituted by a conductor wire that is positioned on a slot bottom portion side of said two conductor wires that are stacked in said slot depth direction; and
- a radially inner winding body that is constituted by a conductor wire that is positioned on a slot opening side of said two conductor wires that are stacked in said slot depth direction;

said armature winding comprises 2n winding groups per phase, where n is a number of slots per phase per pole; and each of said winding groups is configured such that radially outer winding bodies and radially inner winding bodies that are separated by 180 electrical degrees among said radially outer winding bodies and said radially inner winding bodies are connected, and such that half of said radially outer winding bodies and said radially inner winding bodies that are inserted into identical slots among said slots are connected consecutively.

* * * * *